(12) United States Patent
Min et al.

(10) Patent No.: US 11,475,878 B2
(45) Date of Patent: Oct. 18, 2022

(54) ELECTRONIC DEVICE AND OPERATING METHOD THEREOF

(71) Applicant: Samsung Electronics Co., Ltd., Suwon-si (KR)

(72) Inventors: Kyoungbo Min, Suwon-si (KR); Seungdo Choi, Suwon-si (KR); Doohwa Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/081,251

(22) Filed: Oct. 27, 2020

(65) Prior Publication Data
US 2021/0134269 A1 May 6, 2021

(30) Foreign Application Priority Data
Nov. 1, 2019 (KR) .................. 10-2019-0138778

(51) Int. Cl.
*G06N 20/00* (2019.01)
*G10L 15/06* (2013.01)
*G10L 15/16* (2006.01)
*G10L 13/00* (2006.01)

(52) U.S. Cl.
CPC ............ *G10L 15/063* (2013.01); *G10L 13/00* (2013.01); *G10L 15/16* (2013.01)

(58) Field of Classification Search
None
See application file for complete search history.

(56) References Cited

U.S. PATENT DOCUMENTS 6,178,402 B1 * 1/2001 Corrigan ................. G10L 15/02
  704/260
6,792,412 B1 * 9/2004 Sullivan .............. H04L 67/1001
  706/39

(Continued)

FOREIGN PATENT DOCUMENTS

CN  109377978 A  2/2019
JP  2015-040903 A  3/2015

(Continued)

OTHER PUBLICATIONS

International Search Report dated Feb. 10, 2021, issued in International Application No. PCT/KR2020/014930.

(Continued)

*Primary Examiner* — Jakieda R Jackson
(74) *Attorney, Agent, or Firm* — Jefferson IP Law, LLP

(57) ABSTRACT

An electronic device for providing a text-to-speech (TTS) service and an operating method therefor are provided. The operating method of the electronic device includes obtaining target voice data based on an utterance input of a specific speaker, determining a number of learning steps of the target voice data, based on data features including a data amount of the target voice data, generating a target model by training a pre-trained model pre-trained to convert text into an audio signal, by using the target voice data as training data, based on the determined number of learning steps, generating output data obtained by converting input text into an audio signal, by using the generated target model, and outputting the generated output data.

20 Claims, 30 Drawing Sheets

(56) References Cited

U.S. PATENT DOCUMENTS

| | | | |
|---|---|---|---|
| 7,630,742 B2 * | 12/2009 | Park | H01M 50/209 |
| | | | 455/90.3 |
| 8,600,561 B1 * | 12/2013 | Modi | F24F 11/30 |
| | | | 236/46 R |
| 9,711,161 B2 | 7/2017 | Mitsufuji et al. | |
| 10,178,301 B1 * | 1/2019 | Welbourne | G10L 17/10 |
| 10,300,600 B2 | 5/2019 | Yamaoka et al. | |
| 10,930,263 B1 * | 2/2021 | Mahyar | G10L 15/005 |
| 11,183,174 B2 | 11/2021 | Kwon | |
| 2005/0080513 A1 * | 4/2005 | Ito | G06N 3/08 |
| | | | 700/245 |
| 2007/0130491 A1 * | 6/2007 | Mazumder | G01R 31/3177 |
| | | | 714/736 |
| 2009/0319454 A1 * | 12/2009 | Regli | G06V 10/40 |
| | | | 706/13 |
| 2011/0218804 A1 * | 9/2011 | Chun | G10L 15/144 |
| | | | 704/E13.011 |
| 2014/0272894 A1 * | 9/2014 | Grimes | G06F 21/62 |
| | | | 434/350 |
| 2015/0187356 A1 * | 7/2015 | Aronowitz | G10L 17/24 |
| | | | 704/249 |
| 2016/0156771 A1 * | 6/2016 | Lee | G06V 40/28 |
| | | | 455/414.1 |
| 2016/0300564 A1 * | 10/2016 | Nasu | G10L 13/10 |
| 2016/0364608 A1 * | 12/2016 | Sengupta | G06F 16/35 |
| 2017/0236512 A1 * | 8/2017 | Williams | G06F 40/40 |
| | | | 381/79 |
| 2018/0182373 A1 * | 6/2018 | Almudafar-Depeyrot | |
| | | | G10L 13/0335 |
| 2018/0211649 A1 | 7/2018 | Li | |
| 2018/0336880 A1 | 11/2018 | Arik et al. | |
| 2019/0019500 A1 | 1/2019 | Jang et al. | |
| 2019/0220748 A1 * | 7/2019 | Denil | G06N 3/0445 |
| 2019/0244095 A1 * | 8/2019 | Huang | G06F 9/5011 |
| 2019/0251952 A1 * | 8/2019 | Arik | G10L 13/033 |
| 2019/0266493 A1 * | 8/2019 | Gao | G06N 3/08 |
| 2019/0272818 A1 * | 9/2019 | Fernandez | G10L 13/00 |
| 2019/0385608 A1 * | 12/2019 | Lee | G10L 15/10 |
| 2020/0005766 A1 * | 1/2020 | Kim | G10L 15/22 |
| 2020/0082807 A1 | 3/2020 | Kim et al. | |
| 2020/0111484 A1 * | 4/2020 | Aleksic | G10L 15/187 |
| 2020/0126566 A1 * | 4/2020 | Wang | G10L 17/06 |
| 2020/0243094 A1 * | 7/2020 | Thomson | G10L 15/22 |
| 2021/0097431 A1 * | 4/2021 | Olgiati | G06N 5/046 |
| 2021/0110254 A1 * | 4/2021 | Hoang | G06F 40/58 |
| 2021/0118425 A1 * | 4/2021 | Pollet | G10L 15/30 |

FOREIGN PATENT DOCUMENTS

| | | |
|---|---|---|
| JP | 6121273 B2 | 4/2017 |
| JP | 6400750 B2 | 8/2018 |
| KR | 10-2019-0008137 A | 1/2019 |
| KR | 10-2019-0085882 A | 7/2019 |
| KR | 10-2019-0086134 A | 7/2019 |
| KR | 10-2020-0025750 A | 3/2020 |
| WO | 2018/183650 A2 | 10/2018 |

OTHER PUBLICATIONS

European Search Report dated Jun. 24, 2022, issued in European Patent Application No. 20883469.7.

* cited by examiner

FIG. 6

DATA FEATURES OF TARGET VOICE DATA

| TARGET VOICE DATA | | Acoustic Feature | | | | Speaker Feature | | | |
|---|---|---|---|---|---|---|---|---|---|
| | | FS | BW | SNR | RT | Gend | Lang | F0/Pitch | Tempo |
| WAV2 | | 24kFs | 11kHz | 55dB | 0.5s | F_KID | KR | 〰️ | 120% |
| Type | | 10 | 01 | 11 | 10 | 11 | 00 | 11 | 11 |
| WAV3 | | 16kFs | 8kHz | 27dB | 2.7s | M_AD | EN | 〰️ | 80% |
| Type | | 00 | 00 | 01 | 01 | 00 | 10 | 10 | 10 |

610 — WAV2
611 — FS
612 — BW
613 — SNR
614 — RT
615 — Gend
616 — Lang
617 — F0/Pitch
618 — Tempo
620 — Type row

FIG. 7

| DATA AMOUNT (hrs) | Q'ty (A) | | Signal to Noise Ratio (B) | | Reverberation Time (C) | | Distance to Pre (D) | | Content type (E) | |
|---|---|---|---|---|---|---|---|---|---|---|
| | Step | | SNR(dB) | Step | RT(sec) | Step | Distance | Step | Similarity | Step |
| 20hrs↑ | 3000k (w/o Pre) | | 55dB↑ | *1 | 0.5s↓ | *1 | 75%↑ | *0.75 | 75%↑ | *0.75 |
| 10~20hrs | hrs*100k | | 40~55dB | *1.25 | 0.5~1.5s | *1.25 | 50~75% | *1 | 50~75% | *1 |
| 1~10hrs | hrs*75k | | 25~40dB | *1.5 | 1.5~3.0s | *1.5 | 25~50% | *1.25 | 25~50% | *1.5 |
| ~1hrs | hrs*50k | | ~25dB | *2 | 3.0s↑ | *2 | ~25% | *1.5 | ~25% | *2 |

| TARGET VOICE DATA | DATA AMOUNT (hrs) | SNR | RT | Steps |
|---|---|---|---|---|
| WAV2 | 2hrs | 60dB | 0.3s | 150K |
| WAV3 | 2hrs | 27dB | 1.0s | 281K |
| WAV4 | 10min | 45dB | 2.0s | 15K |
| WAV5 | 30sec | 60dB | 5.0s | 0.8K |

801 points to WAV2 row; 802 points to 150K.

FIG. 12

| PRE-TRAINED MODEL | DATA FEATURES OF PRE-LEARNED VOICE DATA | | | | | | PRE-LEARNED STEPS |
|---|---|---|---|---|---|---|---|
| | Acoustic Feature | | Speaker Feature | | | | |
| ID | FS | BW | Gend | Lang | F0/Pitch | Tempo | Pre Learned step |
| 11 | 48kFs | 24kHz | F_KID | EN(US) | 200Hz~ | 150% | 3000k~ |
| 10 | 24kFs | 12kHz | F_ADULT | EN(GB) | 160~200 | 125% | 2000~3000k |
| 01 | 22kFs | 11kHz | M_KID | CN | 120~160 | 100% | 1000~2000k |
| 00 | 16kFs | 8kHz | M_ADULT | KR | ~120Hz | 75% | ~1000k |

FIG. 13

| TARGET VOICE DATA | DATA FEATURES | | | | | | LEARNING STEPS |
|---|---|---|---|---|---|---|---|
| | Acoustic Feature | | Speaker Feature | | | | |
| | FS | BW | Gend | Lang | F0/Pitch | Tempo | Learning step |
| WAV2 | 24kFs | 11kHz | F_KID | KR | 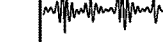 | 120% | 187.5k |

ELECTRONIC DEVICE AND OPERATING METHOD THEREOF

CROSS-REFERENCE TO RELATED APPLICATION(S)

This application is based on and claims priority under 35 U.S.C. § 119 of a Korean patent application number 10-2019-0138778, filed on Nov. 1, 2019, in the Korean Intellectual Property Office, the disclosure of which is incorporated by reference herein in its entirety.

BACKGROUND

1. Field

The disclosure relates to an electronic device for providing a text-to-speech (TTS) service, and an operating method thereof. More particularly, the disclosure relates to an electronic device for providing a service of outputting an audio signal with a voice similar to that of a specific person, and an operating method thereof.

2. Description of Related Art

Artificial intelligence (AI) systems are computer systems capable of implementing human-level intelligence, and refer to systems in which a machine autonomously learns, makes determinations, and becomes smarter unlike existing rule-based smart systems. A recognition rate may be increased and user preferences may be understood more accurately in proportion to the number of iterations of the AI systems, and thus, the existing rule-based smart systems have been gradually replaced by AI systems based on deep learning.

AI technology includes machine learning (or deep learning) and element technologies using machine learning.

Machine learning refers to an algorithm technology for autonomously classifying/learning features of input data, and the element technologies refer to technologies using the machine learning algorithm such as deep learning, and include technical fields such as linguistic understanding, visual understanding, inference/prediction, knowledge representation, and operation control.

Examples of various fields to which the AI technology is applicable are as described below. Linguistic understanding refers to a technology for recognizing and applying/processing languages/characters of humans, and includes natural language processing, machine translation, dialogue systems, queries and responses, speech recognition/synthesis, etc. Visual understanding refers to a technology for recognizing and processing an object like human vision, and includes object recognition, object tracking, image search, human recognition, scene understanding, spatial understanding, image enhancement, etc. Inference/prediction refers to a technology for determining information and logically performing inference and prediction, and includes knowledge/probability-based inference, optimized prediction, preference-based planning, recommendation, etc. Knowledge representation refers to a technology for automatically processing human experience information to knowledge data, and includes knowledge construction (data generation/classification), knowledge management (data utilization), etc. Operation control refers to a technology for autonomous driving of vehicles and motion control of robots, and includes motion control (e.g., navigation, collision avoidance, and driving control), manipulation control (e.g., action control), etc.

Currently, along with the development of electronic devices capable of performing a variety of functions by using AI technology, electronic devices for providing a TTS service are being developed. TTS is a speech synthesis technology for converting text into audio and outputting the audio.

To provide a TTS service for outputting audio with a voice similar to that of a specific person desired by a user, an electronic device needs to pre-learn voice data obtained by recording the voice of the specific person.

In addition, a method of providing a TTS service for outputting audio similar to a voice of a specific person and having excellent pronunciation, prosody, and sound quality even when a small amount of voice data obtained by recording the voice of the specific person is used for pre-training is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for providing a text-to-speech (TTS) service, and an operating method thereof.

Another aspect of the disclosure is to provide an electronic device for providing a high-performance TTS service by learning a small amount of voice data obtained by recording a voice of a specific person, and an operating method thereof.

Another aspect of the disclosure is to provide a computer-readable recording medium having recorded thereon a program for executing the above-described method in a computer. Technical problems to be solved are not limited to the above-described technical problems, and other technical problems may also be present.

Additional aspects will be set forth in part in the description which follows and, in part, will be apparent from the description, or may be learned by practice of the presented embodiments.

In accordance with an aspect of the disclosure, an operating method of an electronic device is provided. The method includes obtaining target voice data based on an utterance input of a specific speaker, determining a number of learning steps of the target voice data, based on data features including a data amount of the target voice data, generating a target model by training a pre-trained model pre-trained to convert text into an audio signal, by using the target voice data as training data, based on the determined number of learning steps, generating output data obtained by converting input text into an audio signal, by using the generated target model, and outputting the generated output data.

In accordance with another aspect of the disclosure, an electronic device is provided. The electronic device includes a memory storing one or more instructions, and at least one processor coupled to the memory and configured to execute the one or more instructions stored in the memory to obtain target voice data based on an utterance input of a specific speaker, determine a number of learning steps of the target voice data, based on data features including a data amount of the target voice data, generate a target model by training a pre-trained model pre-trained to convert text into an audio signal, by using the target voice data as training data, based on the determined number of learning steps, generate output data obtained by converting input text into an audio signal, by using the generated target model, and output the generated output data.

In accordance with another aspect of the disclosure, a non-transitory computer-readable recording medium is provided. The non-transitory computer-readable recording medium has recorded thereon at least one program including commands, which when executed by a computer, performs the above-described operating method.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a table for describing an example of data features of target voice data according to an embodiment of the disclosure;

FIG. 7 is a table for describing an example of a method of determining the number of learning steps of target voice data according to an embodiment of the disclosure;

FIG. 12 is a table for describing an example of pre-trained models stored in a memory according to an embodiment of the disclosure;

FIG. 13 is a table for describing an example of selecting a pre-trained model according to an embodiment of the disclosure;

Throughout the drawings, like reference numerals will be understood to refer to like parts, components, and structures.

DETAILED DESCRIPTION

Figure 1:
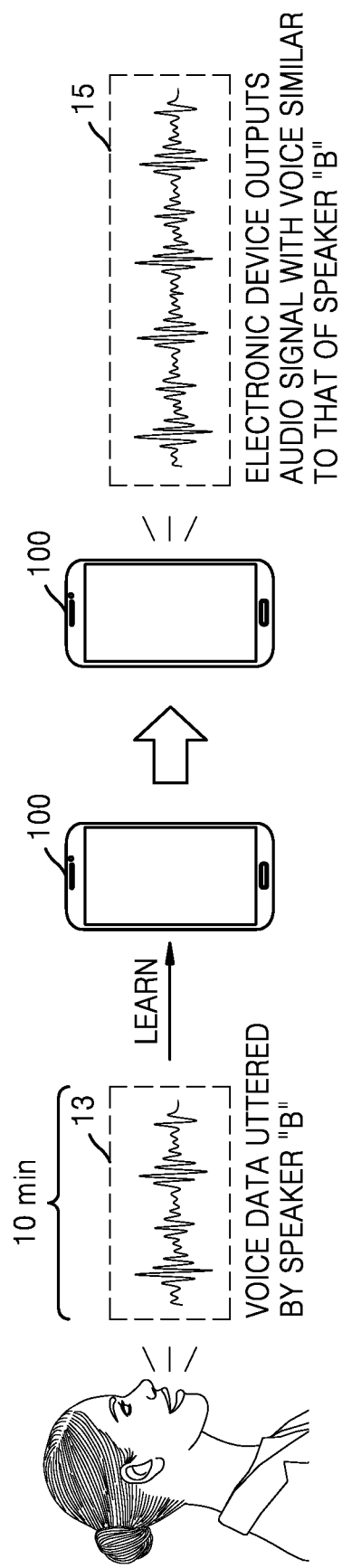
FIG. 1 is a diagram for briefly describing an example of operation of an electronic device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms such as "first" and "second" may be used to designate various elements, but the elements should not be limited by these terms. These terms are merely used to distinguish one element from another.

Throughout the disclosure, the expression "at least one of a, b or c" indicates only a, only b, only c, both a and b, both a and c, both b and c, all of a, b, and c, or variations thereof.

Terms in the following description are merely used to describe specific embodiments of the disclosure, and are not intended to limit the scope of the disclosure. The singular forms "a", "an", and "the" are intended to include the plural forms as well, unless the context clearly indicates otherwise. Throughout the specification, when an element is referred to as being "connected to" another element, the element can be "directly connected to" the other element or be "electrically connected to" the other element via an intervening element. The terms "comprises", "comprising", "includes" and/or "including", when used herein, specify the presence of stated elements, but do not preclude the presence or addition of one or more other elements.

The definite article "the" or other demonstratives may indicate both a singular form and a plural form. Unless the context clearly indicates otherwise, operations included in a method according to an embodiment of the disclosure may be performed in an appropriate order. The order of describing the operations does not limit the scope of the disclosure.

The phrase "an embodiment of the disclosure" at various parts of this specification does not always designate the same embodiment of the disclosure.

An embodiment of the disclosure may be represented as functional blocks and various processing steps. Some or all of the functional blocks may be implemented by various numbers of hardware and/or software elements configured to perform certain functions. For example, the functional blocks of the disclosure may be implemented by one or more microprocessors or circuit elements for certain functions. As another example, the functional blocks of the disclosure may be implemented using various programming or scripting languages. The functional blocks may be implemented using algorithms executed by one or more processors. Furthermore, the disclosure might employ known technologies for electronic settings, signal processing, and/or data processing. Terms such as "mechanism", "element", "means", and "configuration" may be widely used and are not limited to mechanical and physical configurations.

In addition, connection lines or connection members between elements shown in the drawings merely illustrate examples of functional connections and/or physical or circuit connections. Connections between elements may be represented by replaceable or additional various functional connections, physical connections, or circuit connections in an actual device.

Reference will now be made in detail to embodiments of the disclosure, examples of which are illustrated in the accompanying drawings.

According to an embodiment of the disclosure, a 'pre-trained model' may refer to a model which has pre-learned voice data based on an utterance of an unspecific speaker, e.g., 'A'.

According to an embodiment of the disclosure, a 'target model' may refer to a trained model generated by additionally training a pre-trained model, which has pre-learned voice data based on an utterance of an unspecific speaker (e.g., 'A'), based on voice data based on an utterance of a specific speaker (e.g., 'B') by using the pre-trained model as an initial state.

According to an embodiment of the disclosure, target voice data may be voice data to be learned to generate a target model, and refer to voice data obtained based on an utterance of a specific speaker who has a voice to be used to provide a TTS service.

According to an embodiment of the disclosure, data features may be features of voice data and include at least one of a data amount, acoustic features, speaker features, or content features.

According to an embodiment of the disclosure, the number of learning steps may refer to the number of steps for training a pre-trained model by using target voice data as training data.

According to an embodiment of the disclosure, the number of pre-learned steps of the pre-trained model may refer to the number of steps through which the pre-trained model has pre-learned voice data of an unspecific speaker.

According to an embodiment of the disclosure, a learning rate may refer to a parameter indicating a degree by which data learned in a current learning step is to be reflected to weight values of a whole neural network when a trained model learns training data. The learning rate may refer to a parameter for determining a degree by which weight values of a whole neural network are to be adjusted due to a current learning step.

FIG. 1 is a diagram for briefly describing an example of operation of an electronic device 100, according to an embodiment of the disclosure.

According to an embodiment of the disclosure, the electronic device 100 may provide a text-to-speech (TTS) service. TTS is a speech synthesis technology for converting text into audio and outputting the audio.

According to an embodiment of the disclosure, to provide a TTS service, that is, to generate output data obtained by converting input text into an audio signal and output the audio signal with a voice similar to that of, for example, a specific speaker B, the electronic device 100 needs to pre-learn voice data obtained based on an utterance of the speaker B.

Referring to FIG. 1, the electronic device 100 may train a model by using, as training data, voice data 13 (e.g., a duration of 10 minutes) obtained based on an utterance of the specific speaker B. The electronic device 100 may output an audio signal 15 with a voice similar to that of the speaker B by using the model trained based on the voice data of the speaker B.

A trained model according to an embodiment of the disclosure may be a TTS model for obtaining certain text as input data and outputting an audio signal as output data, and include an artificial intelligence (AI) model using a machine learning algorithm such as deep learning.

In general, when target voice data to be learned is provided in a small amount (e.g., a duration of 30 minutes), although a pronunciation error rate may be lowered by additionally training a pre-trained model based on the target voice data, a large number of learning steps may result in a high pronunciation error rate of a target model generated based on training. This is because, when the number of learning steps increases, a pre-training effect of the pre-trained model gradually disappears and training focused on only a small amount of target data is iterated. Therefore, instead of unconditionally iterating a large number of learning steps by using a small amount of target voice data, a method of determining and iterating an optimal number of learning steps may be required.

According to an embodiment of the disclosure, by determining an optimal number of learning steps and training a pre-trained model based on a small amount of target data through the optimal number of learning steps, although the small amount of training data is used, a pronunciation error rate may not be increased.

According to an embodiment of the disclosure, by training a pre-trained model through an optimal number of learning steps determined based on a data amount of target voice data to be learned by the electronic device 100, a target model having excellent performance in pronunciation, prosody, intonation, sound quality, etc. may be generated.

According to an embodiment of the disclosure, the pronunciation error rate may refer to inaccuracy of pronunciation. The pronunciation error rate may refer to a degree by which an utterance differs from the standard pronunciation rules. For example, the pronunciation error rate may include a word-based pronunciation error rate and an utterance-based pronunciation error rate. The pronunciation error rate (%) may be calculated as a percentage of abnormally uttered words from among all uttered words (e.g., (abnormally uttered words/all uttered words)×100 or (abnormal utterances/all utterances)×100).

According to an embodiment of the disclosure, the prosody may refer to an intensity, a pitch, a length, etc. of sound. The prosody may be determined by whether an output audio signal is heard like a natural utterance of a specific language.

According to an embodiment of the disclosure, the intonation may refer to relative pitch variations of sound.

According to an embodiment of the disclosure, the sound quality may indicate acoustic features and refer to accuracy or clarity of audio output.

According to an embodiment of the disclosure, when voice data obtained based on an utterance of a specific speaker, i.e., training data, is provided in a small amount less than or equal to a preset value, the electronic device 100 may provide a TTS service for outputting an audio signal similar to a voice of the specific speaker and excellent in pronunciation, prosody, sound quality, etc., by training a model based on the small amount of training data through an appropriate number of learning steps.

According to an embodiment of the disclosure, when a data amount of the training data corresponds to, for example, 2 hours, the electronic device 100 may generate a trained model that exhibits a similar performance in a pronunciation error rate, prosody, sound quality, etc. of output data of the trained model within a certain range compared to a case when the data amount of the training data corresponds to, for example, 30 seconds. According to an embodiment of the disclosure, when the data amount of the training data is small, e.g., 30 seconds, a training result similar to that of a case when the data amount of the training data corresponds to 2 hours may be obtained. A method of determining an appropriate number of learning steps of a small amount of voice data based on an utterance of a specific speaker, and training a model through the determined number of learning steps, according to an embodiment of the disclosure, will be described in detail below with reference to the drawings.

Meanwhile, a trained model may be constructed considering, for example, an applicable field of the trained model, the purpose of training, or the computing performance of a device. The trained model may be, for example, a model based on a neural network. For example, the trained model may use a deep neural network (DNN), a recurrent neural network (RNN), or a bidirectional recurrent deep neural network (BRDNN), but is not limited thereto.

The electronic device 100 is illustrated as a smartphone in FIG. 1 according to an embodiment of the disclosure, but is not limited thereto. According to an embodiment of the disclosure, the electronic device 100 may be an electronic device for providing a TTS service, and be implemented as various electronic devices, e.g., an AI speaker, a chatbot, a dialogue system, a conversational agent, a reception robot, an unmanned kiosk, a wearable device, a tablet PC, a laptop computer, a head-mounted display (HMD), an ebook reader, a personal digital assistant (PDA), and a portable multimedia player (PMP).

FIG. 1 merely shows an embodiment of the disclosure, and the disclosure is not limited thereto.

Embodiments of the disclosure will now be described in detail with reference to the drawings.

Figure 2:
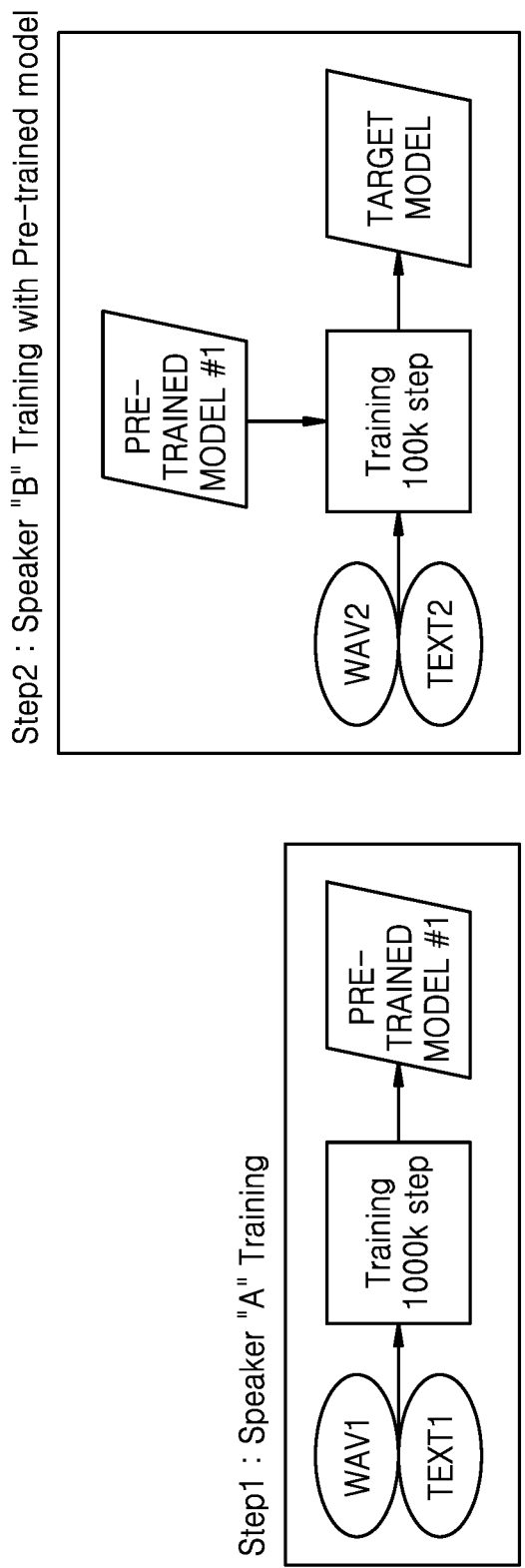
FIG. 2 is a diagram for describing training of a pre-trained model and a target model according to an embodiment of the disclosure.

FIG. 2 is a diagram for describing training of a pre-trained model and a target model, according to an embodiment of the disclosure.

According to an embodiment of the disclosure, a 'trained model' may be a TTS model trained to obtain certain text as input data and generate output data obtained by converting the input data into an audio signal, and refer to a 'pre-trained model' or a 'target model' depending on used training data.

According to an embodiment of the disclosure, the 'pre-trained model' may refer to a model which has pre-learned voice data based on an utterance of an unspecific speaker, e.g., 'A'.

According to an embodiment of the disclosure, the 'target model' may refer to a trained model generated by additionally training a pre-trained model, which has pre-learned voice data based on an utterance of an unspecific speaker A, based on voice data based on an utterance of a specific speaker, e.g., 'B', by using the pre-trained model as an initial state.

Referring to FIG. 2, in Step 1, the electronic device 100 may generate a pre-trained model #1 by training an untrained initial-state model through a number of learning steps (e.g., 1000k) by using, as training data, audio data WAV1 based on an utterance of the unspecific speaker A, and text data TEXT1 corresponding to the audio data WAV1 and including text having the same meaning as the audio data WAV1.

In Step 2, the electronic device 100 may generate a target model by additionally training the model #1, which is pre-trained in Step 1, through a number of learning steps (e.g., 100k) by using, as training data, audio data WAV2 based on an utterance of the specific speaker B, and text data TEXT2 corresponding to the audio data WAV2 and including text having the same meaning as the audio data WAV2.

According to an embodiment of the disclosure, the electronic device 100 may generate the target model by additionally training the pre-trained model #1, which has pre-learned data based on an utterance of the unspecific speaker (e.g., 'A'), based on data based on an utterance of the specific speaker B, by using the pre-trained model #1 as an initial state.

According to an embodiment of the disclosure, to generate the target model according to Step 1 and Step 2, by iterating an optimal number of learning steps, even when the data based on an utterance of the specific speaker B is provided in a small amount, a target model for outputting an audio signal similar to a voice of the specific speaker B and having a low pronunciation error rate may be generated. As such, the electronic device 100 may provide a TTS service for outputting an audio signal with a voice similar to that of the specific speaker (e.g., 'B'), by using the generated target model.

According to an embodiment of the disclosure, the number of learning steps may refer to the number of steps for training a pre-trained model by using target voice data as training data.

According to an embodiment of the disclosure, the number of pre-learned steps of a pre-trained model may refer to the number of steps through which the pre-trained model has pre-learned voice data of an unspecific speaker.

For example, 1k learning steps may mean that all sentences included in audio data and text data corresponding to the audio data are learned 1000 times.

For example, 1k learning steps may mean that every 32 sentences (i.e., a batch size) included in audio data and text data corresponding to the audio data are learned 1000 times.

Meanwhile, the electronic device 100 may train a model through supervised learning using training data as input values.

In addition, the electronic device 100 may store the generated pre-trained model and target model in a memory 1700 (see FIG. 34) of the electronic device 100.

According to an embodiment of the disclosure, the electronic device 100 may store the generated pre-trained model and target model in an external device (not shown) connected to the electronic device 100 through a wired or wireless network.

Figure 3:
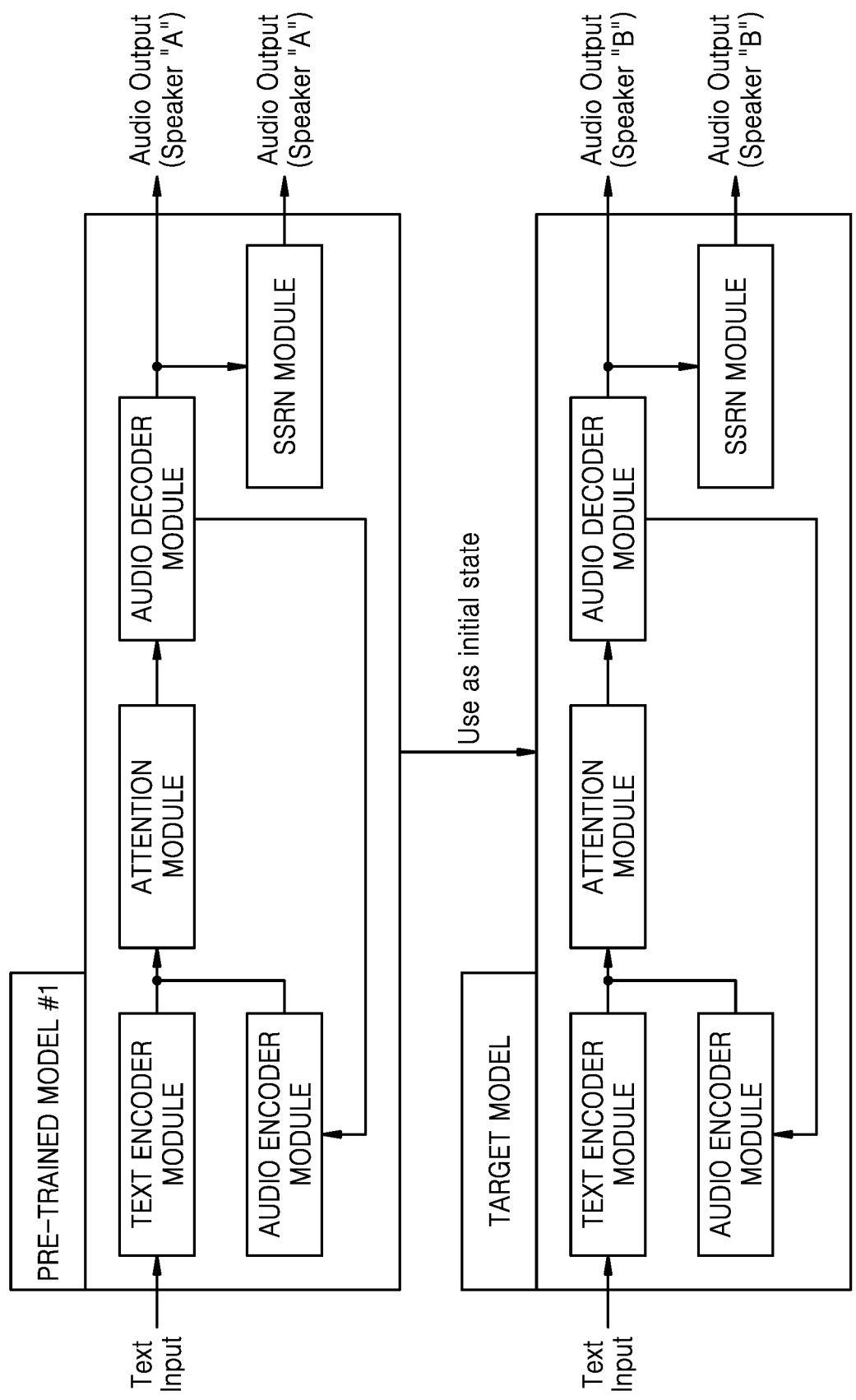
FIG. 3 is a diagram for describing structures of a pre-trained model and a target model according to an embodiment of the disclosure.

FIG. 3 is a diagram for describing structures of a pre-trained model and a target model, according to an embodiment of the disclosure.

According to an embodiment of the disclosure, a 'pre-trained model' or a 'target model' may be a TTS model for obtaining certain text as input data and generating output data obtained by converting the input data into an audio signal.

Referring to FIG. 3, the 'pre-trained model' and the 'target model' may be TTS models configured in the same structure. For example, the 'pre-trained model' and the 'target model' may be configured in a structure including a text encoder module, an audio encoder module, an attention module, an audio decoder module, and a SSRN module.

According to an embodiment of the disclosure, a 'pre-trained model' #1 may be a model which has pre-learned voice data based on an utterance of an unspecific speaker, e.g., 'A'. When certain text is obtained as input data, the pre-trained model #1 may output an audio signal converted to a voice similar to that of the unspecific speaker A.

According to an embodiment of the disclosure, a 'target model' may be a model obtained by training the pre-trained model #1 based on voice data based on an utterance of a specific speaker, e.g., 'B', by using the pre-trained model #1 as an initial state. When certain text is obtained as input data, the target model may output an audio signal converted to a voice similar to that of the specific speaker B.

According to an embodiment of the disclosure, the 'target model' may be a model obtained by additionally training the 'pre-trained model' #1 based on the voice data based on an utterance of the specific speaker B by using the 'pre-trained model' #1 as an initial state.

According to an embodiment of the disclosure, a trained model may include a plurality of neural network layers. Each of the plurality of neural network layers may have a plurality of weight values and perform neural network computation through computation between a computation result of a previous layer and the plurality of weight values. The plurality of weight values of the plurality of neural network layers may be optimized based on a training result of the trained model. For example, the plurality of weight values may be refined to reduce or minimize a loss value or a cost value obtained by a trained model during a training process.

According to an embodiment of the disclosure, the target model may have values refined from a plurality of weight values of a plurality of neural network layers of the pre-trained model #1 as a result of additionally training the pre-trained model #1 based on the voice data of the specific speaker B by using the pre-trained model #1 as an initial state.

Figure 4:
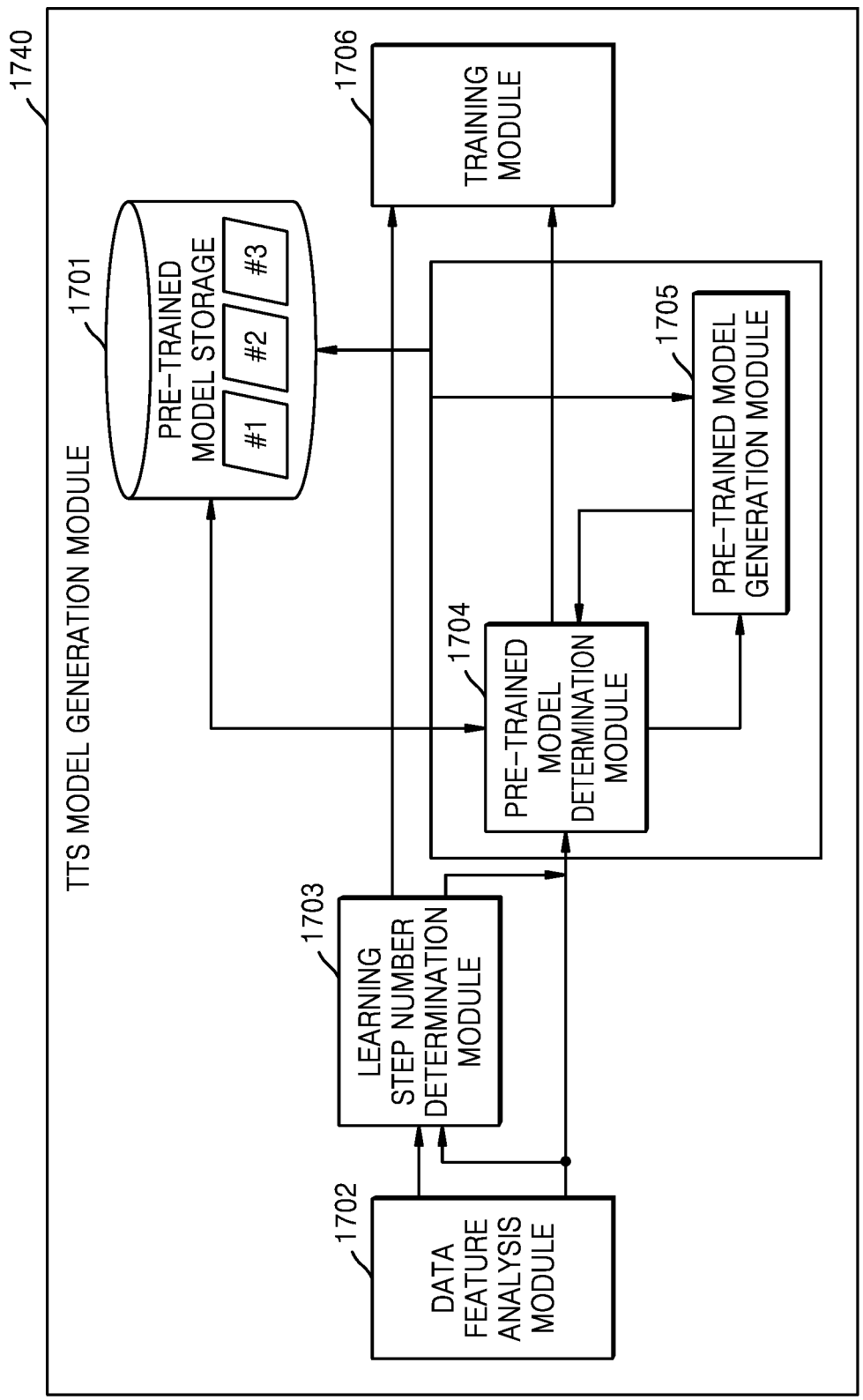
FIG. 4 is a diagram for describing a structure of a text-to-speech (TTS) model generation module according to an embodiment of the disclosure.

FIG. 4 is a diagram for describing a structure of a TTS model generation module 1740, according to an embodiment of the disclosure.

According to an embodiment of the disclosure, the memory 1700 (see FIGS. 33 and 34) of the electronic device 100 may include the TTS model generation module 1740. According to an embodiment of the disclosure, the TTS model generation module 1740 may be implemented as at least one software module (or at least one program module including instructions).

According to an embodiment of the disclosure, a processor 1300 (see FIGS. 33 and 34) of the electronic device 100 may perform an operation by invoking at least one software module included in the TTS model generation module 1740.

According to an embodiment of the disclosure, the TTS model generation module 1740 may include a pre-trained model storage 1701, a data feature analysis module 1702, a learning step number determination module 1703, a pre-trained model determination module 1704, a pre-trained model generation module 1705, and a training module 1706.

According to an embodiment of the disclosure, the pre-trained model storage 1701 may store one or more pre-trained models (e.g., pre-trained models #1, #2, and #3). For example, the pre-trained models may be models which have pre-learned voice data based on utterances of speakers having different genders, tones, intonations, and pronunciations.

According to an embodiment of the disclosure, the pre-trained model storage 1701 may store voice data pre-learned by the pre-trained models (e.g., the pre-trained models #1, #2, and #3).

According to an embodiment of the disclosure, the one or more pre-trained models (e.g., the pre-trained models #1, #2, and #3) may be stored in an external device (not shown). According to an embodiment of the disclosure, the voice data pre-learned by the pre-trained models (e.g., the pre-trained models #1, #2, and #3) may be stored in an external device (not shown).

According to an embodiment of the disclosure, the data feature analysis module 1702 may obtain target voice data based on an utterance input of a specific speaker. According to an embodiment of the disclosure, the data feature analysis module 1702 may analyze data features of the target voice data.

According to an embodiment of the disclosure, the target voice data may be voice data to be learned to generate a target model, and refer to voice data obtained based on an utterance of a specific speaker who has a voice to be used to provide a TTS service.

According to an embodiment of the disclosure, data features may be features of voice data and include at least one of a data amount, acoustic features, speaker features, or content features.

For example, the data feature analysis module 1702 may analyze, as the data features of the target voice data, that the data amount corresponds to a duration of 5 minutes and that the speaker is a middle-aged male who speaks Korean at a medium tempo.

According to an embodiment of the disclosure, the learning step number determination module 1703 may determine the number of learning steps of the target voice data, based on the data features including the data amount of the target voice data.

The learning step number determination module 1703 may determine the number of learning steps of the target voice data, based on similarity between at least one of the data features of the target voice data and at least one of data features of voice data used for pre-training of a pre-trained model.

According to an embodiment of the disclosure, the learning step number determination module 1703 may determine the number of learning steps to minimize a loss value obtained by a trained model during a training process.

According to an embodiment of the disclosure, the pre-trained model determination module 1704 may select a method of determining a pre-trained model from among the one or more pre-trained models (e.g., #1, #2, and #3) stored in the pre-trained model storage 1701.

According to an embodiment of the disclosure, the pre-trained model determination module 1704 may select a pre-trained model from among the one or more pre-trained models stored in the pre-trained model storage 1701, or newly generate a pre-trained model by invoking the pre-trained model generation module 1705, based on two or more pre-trained models stored in the pre-trained model storage 1701. The pre-trained model generation module 1705 may newly generate a pre-trained model by using voice data used for pre-training of the two or more stored pre-trained models.

According to an embodiment of the disclosure, the pre-trained model determination module 1704 may select a pre-trained model to learn the target voice data, from among the one or more pre-trained models stored in the pre-trained model storage 1701, based on the data features of the target voice data analyzed by the data feature analysis module 1702.

According to an embodiment of the disclosure, the pre-trained model determination module 1704 may select a pre-trained model to learn the target voice data, from among the one or more pre-trained models stored in the pre-trained model storage 1701, based on the number of learning steps determined by the learning step number determination module 1703.

According to an embodiment of the disclosure, the pre-trained model determination module 1704 may determine the selected pre-trained model as a pre-trained model to learn the target voice data.

According to an embodiment of the disclosure, when the pre-trained model determination module 1704 selects the method of newly generating a pre-trained model, based on two or more pre-trained models stored in the pre-trained model storage 1701, the pre-trained model generation module 1705 may be invoked.

According to an embodiment of the disclosure, the pre-trained model generation module 1705 may select a first trained model and a second trained model from among a plurality of pre-trained models stored in the pre-trained model storage 1701, based on the data features of the target voice data analyzed by the data feature analysis module 1702. The pre-trained model generation module 1705 may determine a combination ratio between first voice data used for training of the first trained model and second voice data used for training of the second trained model, based on the data features of the target voice data analyzed by the data feature analysis module 1702. The pre-trained model generation module 1705 may combine the first voice data and the second voice data, based on the determined combination ratio. The pre-trained model generation module 1705 may generate a pre-trained model by using the combined voice data as training data.

The pre-trained model generation module 1705 may determine the number of learning steps of the combined voice data, based on the data features of the target voice data analyzed by the data feature analysis module 1702. The pre-trained model generation module 1705 may generate a pre-trained model by using the combined voice data as training data, based on the determined number of learning steps.

According to an embodiment of the disclosure, the pre-trained model determination module 1704 may determine the pre-trained model generated by the pre-trained model generation module 1705, as a pre-trained model to learn the target voice data.

According to an embodiment of the disclosure, the training module 1706 may train the pre-trained model determined by the pre-trained model determination module 1704, based on the target voice data based on the number of learning steps determined by the learning step number determination module 1703.

According to an embodiment of the disclosure, the training module 1706 may generate a target model by additionally training the pre-trained model, which is determined by the pre-trained model determination module 1704, based on the target voice data by using the pre-trained model as an initial state.

Meanwhile, at least one software module (or at least one program module including instructions) included in the TTS model generation module 1740 may be stored in non-transitory computer-readable media. In this case, the at least one software module may be provided by an operating system (OS) or by a certain application. Alternatively, a part of the at least one software module may be provided by an OS and the other part may be provided by a certain application.

The at least one software module of the TTS model generation module 1740 may be included in one electronic device, but embodiments of the disclosure are not limited thereto, and the at least one software module may be separately included in different electronic devices.

According to an embodiment of the disclosure, the at least one software module of the TTS model generation module 1740 may be produced in the form of a dedicated hardware chip for AI or as a part of a general-purpose processor (e.g., a central processing unit (CPU) or an application processor) or a dedicated graphics processor (e.g., a graphics processing unit (GPU)), and be mounted in the above-mentioned various electronic devices.

Figure 5:
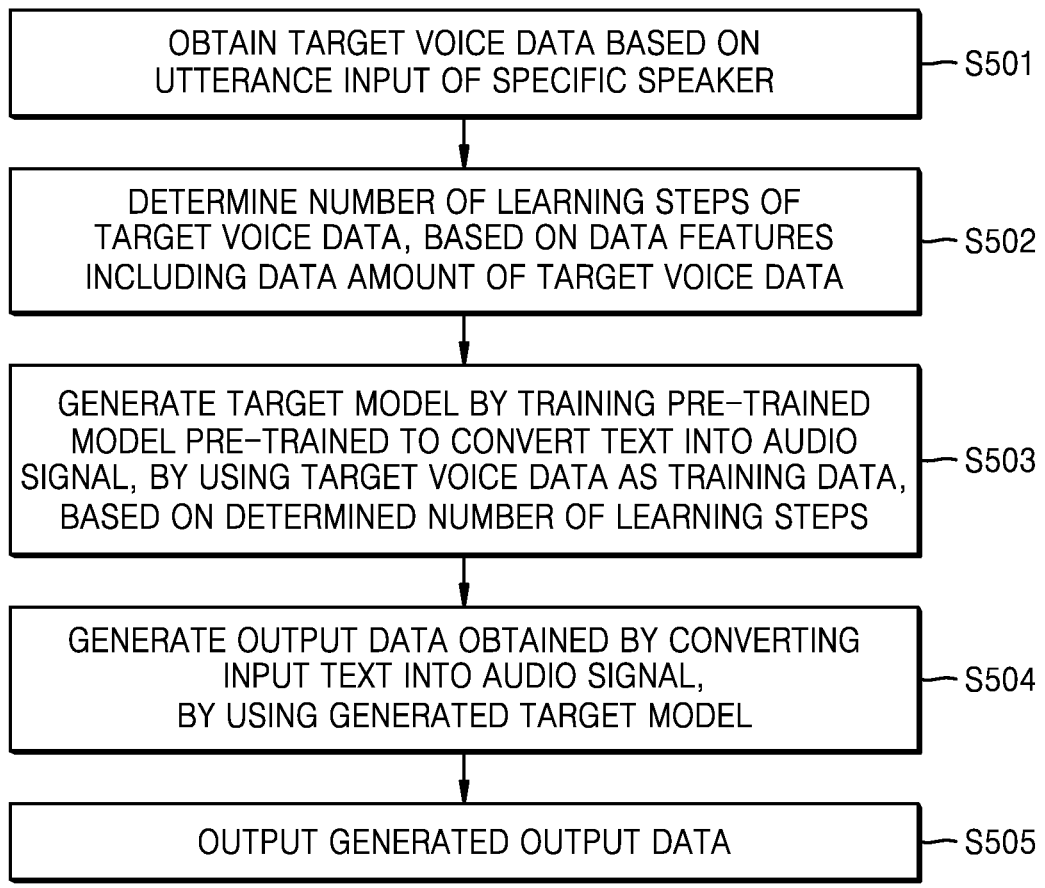
FIG. 5 is a flowchart of an operating method of an electronic device according to an embodiment of the disclosure.
Figures 8, 9:
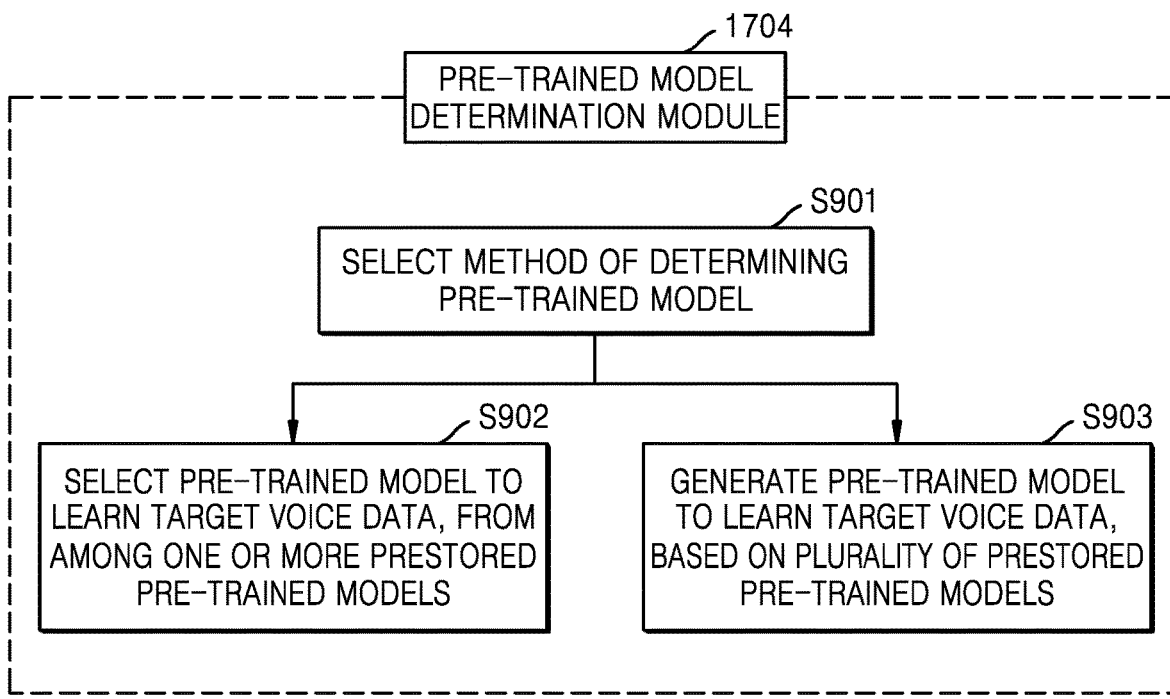
FIG. 8 is a table for describing an example of the number of learning steps of target voice data according to an embodiment of the disclosure.
FIG. 9 is a flowchart for describing an example of a method of determining a pre-trained model according to an embodiment of the disclosure.

FIG. 5 is a flowchart of an operating method of the electronic device 100, according to an embodiment of the disclosure. FIG. 6 is a table for describing an example of data features of target voice data, according to an embodiment of the disclosure. FIG. 7 is a table for describing an example of a method of determining the number of learning steps of the target voice data, according to an embodiment of the disclosure. FIG. 8 is a table for describing an example of the number of learning steps of the target voice data, according to an embodiment of the disclosure.

The flowchart of FIG. 5 will now be described in conjunction with FIGS. 6 to 8.

FIG. 5 shows operations for generating a target model for outputting an audio signal with a voice similar to that of a specific speaker when the electronic device 100 provides a TTS service.

Referring to FIG. 5, in operation S501, the electronic device 100 may obtain target voice data based on an utterance input of a specific speaker.

According to an embodiment of the disclosure, the target voice data may be voice data obtained based on an utterance of a specific speaker who has a voice to be used when the electronic device 100 outputs an audio signal converted from input text.

Figure 34:
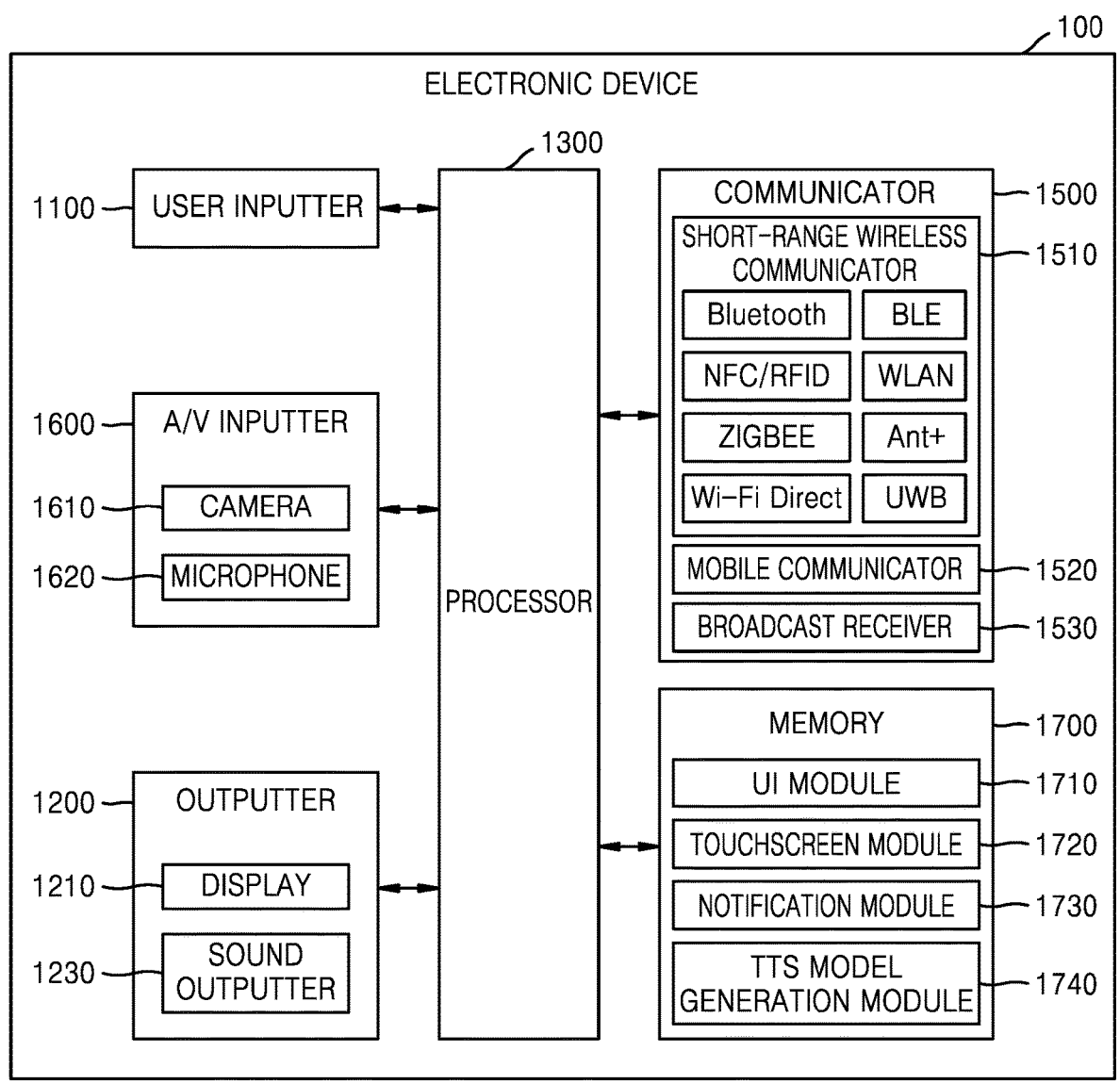
FIG. 34 is a detailed block diagram of an electronic device according to an embodiment of the disclosure.

According to an embodiment of the disclosure, the electronic device 100 may obtain the target voice data based on an utterance input of the specific speaker through a microphone 1620 (see FIG. 34). The electronic device 100 may obtain the target voice data based on an utterance input of the specific speaker extracted from broadcast content received through a broadcast receiver 1530 (see FIG. 34) of the electronic device 100 or a broadcast receiver (not shown) of an external device. The electronic device 100 may obtain the target voice data based on an utterance input of the specific speaker extracted from voice data stored during a call connection.

According to an embodiment of the disclosure, the electronic device 100 may obtain the target voice data prestored in the memory 1700 (see FIG. 34) of the electronic device 100. The electronic device 100 may obtain the target voice data through a communicator 1500, e.g., a transceiver, (see FIG. 34) from an external server.

In operation S502 of FIG. 5, the electronic device 100 may determine the number of learning steps of the target voice data, based on data features including a data amount of the target voice data.

According to an embodiment of the disclosure, the number of learning steps of the target voice data may refer to the number of steps for training a pre-trained model by using the target voice data as training data.

According to an embodiment of the disclosure, data features may be features of voice data and include at least one of a data amount, acoustic features, speaker features, or content features. According to an embodiment of the disclosure, the data amount may refer to a duration of voice data recorded based on an utterance input of a specific speaker. For example, the data amount may be calculated in time units, e.g., 30 seconds or 1 hour. According to an embodiment of the disclosure, the acoustic features may be features of an audio signal included in voice data, and refer to features related to sound quality. For example, the acoustic features may include a sampling rate (FS), a bandwidth (BW), a signal-to-noise ratio (SNR), and a reverberation time (RT), but are not limited thereto.

According to an embodiment of the disclosure, the speaker features may be features of a speaker who has uttered a voice included in voice data, and refer to features related to an utterance. For example, the speaker features may include a gender (Gend), a language (Lang), a fundamental frequency/pitch (F0/Pitch), and a speaking speed (Tempo), but are not limited thereto.

According to an embodiment of the disclosure, the content features may refer to a type of content included in voice data. For example, the content features may include news content, kids cartoon content, and education content, but are not limited thereto.

FIG. 6 shows an example of acoustic features and speaker features from among data features of target voice data.

FIG. 6 shows an example of a prestored table showing data feature values (e.g., binary values) corresponding to acoustic features (e.g., FS, BW, SNR, and RT) and speaker features (e.g., Gend, Lang, F0/Pitch, and Tempo) from among the data features of the target voice data.

According to an embodiment of the disclosure, the data features analyzable from each type of the target voice data may include at least a part of the data features shown in FIG. 6, and may further include data features not shown in FIG. 6.

Referring to the table of FIG. 6, for example, from among acoustic features of target voice data WAV2 (see reference numeral 610), a sampling rate (FS) of 24 kFs corresponds to a data feature value of 10 (see reference numeral 611), a BW of 11 kHz corresponds to a data feature value of 01 (see reference numeral 612), an SNR of 55 dB corresponds to a data feature value of 11 (see reference numeral 613), and an RT of 0.5 s corresponds to a data feature value of 10 (see reference numeral 614). From among speaker features of the target voice data WAV2 (see reference numeral 610), a gender (Gend) indicating a female kid (F_KID) corresponds to a data feature value of 11 (see reference numeral 615), a language (Lang) indicating Korean (KR) corresponds to a data feature value of 00 (see reference numeral 616), frequency features indicated by a fundamental frequency/pitch (F0/Pitch) correspond to a data feature value of 11 (see reference numeral 617), and a speaking speed (Tempo) of 120% corresponds to a data feature value of 11 (see reference numeral 618).

According to an embodiment of the disclosure, the electronic device 100 may calculate 1001111011001111 (see reference numeral 620) as a data feature value of the target voice data WAV2 with reference to the prestored table of FIG. 6.

According to an embodiment of the disclosure, the electronic device 100 may determine the number of learning steps of the target voice data, based on the data feature value of the target voice data by using a certain learning step number determination algorithm.

FIG. 7 is a table for describing an example of a method of determining the number of learning steps of target voice data, based on data features of the target voice data.

According to an embodiment of the disclosure, the electronic device 100 may determine the number of learning steps of the target voice data, based on the data features of the target voice data.

According to an embodiment of the disclosure, the electronic device 100 may determine the number of learning steps of the target voice data, based on similarity between at least one of the data features of the target voice data and at least one of data features of voice data used for pre-training of a pre-trained model.

According to an embodiment of the disclosure, the electronic device 100 may determine the number of learning steps of the target voice data, by using the table of FIG. 7 based on at least one of a data amount of the target voice data, an SNR of the target voice data, an RT, or a Distance to Pre indicating similarity between the target voice data and voice data used for pre-training of a determined pre-trained model.

According to an embodiment of the disclosure, as shown in the table of FIG. 7, data for determining the number of learning steps based on data features may be stored in the form of a table in a memory of the electronic device 100 or a memory or an external device.

According to an embodiment of the disclosure, data for determining the number of learning steps based on data features may be stored in the form of an algorithm in a memory of the electronic device 100 or a memory or an external device.

According to an embodiment of the disclosure, the number of learning steps of the target voice data may be calculated as a product of the number of steps (Q'ty) (A) according to a data amount (hrs) of the target voice data and at least one of a multiplier (B) according to an SNR, a multiplier (C) according to an RT, a multiplier (D) according to a Distance to Pre, or a multiplier (E) according to a content type.

For example, referring to the table of FIG. 7, when a data amount of target data corresponds to 1 hr to 10 hrs, the number of steps (Q'ty) may be calculated as the data amount (hrs)×75k (see reference numeral 701).

For example, when the SNR is 40 dB to 55 dB, the number of learning steps may be calculated as (the number of steps according to the data amount)×1.25 (see reference numeral 702). For example, when the SNR is greater than 55 dB, the number of learning steps may be calculated as (the number of steps according to the data amount)×1 (see reference numeral 706).

For example, when the RT is 0.5 s to 1.5 s, the number of learning steps may be calculated as (the number of steps according to the data amount)×1.25 (see reference numeral 703). For example, when the RT is less than 0.5 s, the number of learning steps may be calculated as (the number of steps according to the data amount)×1 (see reference numeral 707).

For example, when the Distance to Pre is 50% to 75%, the number of learning steps may be calculated as (the number of steps according to the data amount)×1 (see reference numeral 704).

According to an embodiment of the disclosure, the Distance to Pre may refer to similarity (i.e., a distance) between at least one of data features of target voice data and at least one of data features of voice data used for pre-training of a pre-trained model to learn the target voice data.

For example, the Distance to Pre may indicate similarity between an SNR from among acoustic features of the target voice data and an SNR from among acoustic features of the voice data used for pre-training of the pre-trained model. For example, the Distance to Pre may indicate similarity between a gender and a language from among speaker features of the target voice data and a gender and a language from among speaker features of the voice data used for pre-training of the pre-trained model.

For example, when similarity in the content type is 50% to 75%, the number of learning steps may be calculated as (the number of steps according to the data amount)×1 (see reference numeral 705).

According to an embodiment of the disclosure, the content type indicates the type of content included in target voice data, e.g., news content, kids cartoon content, or education content. The multiplier (E) according to the content type may refer to similarity in type between content of target voice data and content of voice data used for pre-training of a pre-trained model to learn the target voice data.

A case in which target voice data has a data amount corresponding to 2 hrs (see reference numeral 701), an SNR of 50 dB (see reference numeral 702), an RT of 0.5 sec (see reference numeral 703), a Distance to Pre of 60% (see reference numeral 704), and a content similarity of 60% (see reference numeral 705) will now be described as an example with reference to the table of FIG. 7. The number of steps (Q'ty) (A) according to the data amount (2 hrs) of the target voice data is 2 hrs×75k (see reference numeral 701), the multiplier (B) according to the SNR is ×1.25, the multiplier (C) according to the RT is ×1.25, the multiplier (D) according to the Distance to Pre is ×1, and the multiplier (E) according to the content type is ×1. Therefore, the number of learning steps of the target voice data may be calculated as (A)×(B)×(C)×(D)×(E), i.e., 2 hrs×75k×1.25×1.25×1×1=234.375k.

FIG. 7 merely shows an example, and the disclosure is not limited thereto.

FIG. 8 shows an example of the number of learning steps of target voice data, which is determined based on data features including a data amount of the target voice data. The number of learning steps of the target voice data in FIG. 8 may be determined with reference to the table of FIG. 7.

For example, for target voice data WAV2 (see reference numeral 801), because the table of FIG. 7 shows that the number of steps (Q'ty) (A) according to a data amount corresponding to 2 hrs is hrs×75k (see reference numeral 701), the multiplier (B) according to an SNR of 60 dB is ×1 (see reference numeral 706), and the multiplier (C) according to an RT of 0.3 s is ×1 (see reference numeral 707), the number of learning steps of the target voice data WAV2 may be calculated as (A)×(B)×(C), i.e., 2 hrs×75k×1×1=150k (see reference numeral 802).

In operation S503 of FIG. 5, the electronic device 100 may generate a target model by training a pre-trained model pre-trained to convert text into an audio signal, by using the target voice data as training data, based on the determined number of learning steps.

According to an embodiment of the disclosure, to generate the target model, the electronic device 100 may determine a pre-trained model to learn the target voice data. According to an embodiment of the disclosure, the electronic device 100 may select a pre-trained model to learn the target voice data, from among one or more pre-trained models stored in the memory 1700. Alternatively, the electronic device 100 may newly generate a pre-trained model to learn the target voice data, based on two or more pre-trained models stored in the memory 1700. The electronic device 100 may newly generate a pre-trained model by using voice data used for pre-training of the stored two or more pre-trained models. A detailed method thereof will be described below with reference to FIG. 15.

According to an embodiment of the disclosure, the electronic device 100 may generate the target model by additionally training the determined pre-trained model based on the target voice data by using the pre-trained model as an initial state.

In operation S504 of FIG. 5, the electronic device 100 may generate output data obtained by converting input text into an audio signal, by using the generated target model.

According to an embodiment of the disclosure, the input text may refer to text used to provide a TTS service. The electronic device 100 may obtain, as the input text, at least one of text obtained based on a user input, text extracted from prestored content, or text generated as a result of executing an application.

According to an embodiment of the disclosure, the electronic device 100 may generate the output data obtained by converting the input text into the audio signal, by inputting the obtained input text to the target model.

In operation S505 of FIG. 5, the electronic device 100 may output the generated output data.

According to an embodiment of the disclosure, the electronic device 100 may output the audio signal through a sound outputter 1230 (see FIG. 34) with a voice similar to that of the specific speaker learned by the target model.

FIGS. 5 to 8 merely show embodiments of the disclosure, and the disclosure is not limited thereto.

FIG. 9 is a flowchart for describing an example of a method of determining a pre-trained model, according to an embodiment of the disclosure.

Referring to FIG. 9, in operation S901, the pre-trained model determination module 1704 (see FIG. 4) of the electronic device 100 according to an embodiment of the disclosure may select a method of determining a pre-trained model.

According to an embodiment of the disclosure, the pre-trained model determination module 1704 (see FIG. 4) may select a pre-trained model to learn target voice data, from among one or more prestored pre-trained models (operation S902). Alternatively, the pre-trained model determination module 1704 (see FIG. 4) may generate a pre-trained model to learn the target voice data, based on a plurality of prestored pre-trained models (operation S903).

According to an embodiment of the disclosure, one or more pre-trained models may be stored in the pre-trained model storage 1701 (see FIG. 4).

According to an embodiment of the disclosure, the method of selecting a prestored pre-trained model (operation S902) may provide a fast result because a small amount of computation is required.

According to an embodiment of the disclosure, the method of generating a pre-trained model (operation S903) may not provide a fast result because a large amount of computation is required to newly generate an optimal pre-trained model to learn the target voice data, but may provide a result having a high similarity to a target voice.

According to an embodiment of the disclosure, the electronic device 100 may set or change the method of determining a pre-trained model, based on selection of a user.

For example, the user may select and set an option for receiving a fast service result. In this case, the electronic device 100 may provide a fast result by selecting an appropriate pre-trained model from among prestored pre-trained models, and training the selected pre-trained model based on the target voice data by using the pre-trained model as an initial state.

For example, the user may select and set an option for receiving a service result having a high similarity to a target voice. In this case, the electronic device 100 may provide a result having a high similarity to a target voice by newly generating an optimal pre-trained model by using voice data used for pre-training of two or more prestored pre-trained models, and training the generated pre-trained model based on the target voice data by using the pre-trained model as an initial state.

According to an embodiment of the disclosure, the pre-trained model determination module 1704 (see FIG. 4) may select the method of determining a pre-trained model, based on hardware (HW) resources of the electronic device 100.

For example, upon determining that a large amount of computation may not be appropriately performed, the processor 1300 (see FIG. 34) of the electronic device 100 may select the method of selecting a pre-trained model to learn the target voice data, from among the prestored pre-trained models. Upon determining that a large amount of computation may be appropriately performed, the processor 1300 (see FIG. 34) of the electronic device 100 may select the method of newly generating a pre-trained model to learn the target voice data, based on the prestored pre-trained models.

For example, the electronic device 100 may preferentially provide a fast service result by using the method of selecting a pre-trained model from among the prestored pre-trained models and additionally provide a result having a high similarity to a target voice by using the method of newly generating a pre-trained model, based on the prestored pre-trained models.

FIG. 9 merely shows an embodiment of the disclosure, and the disclosure is not limited thereto.

Figure 10:
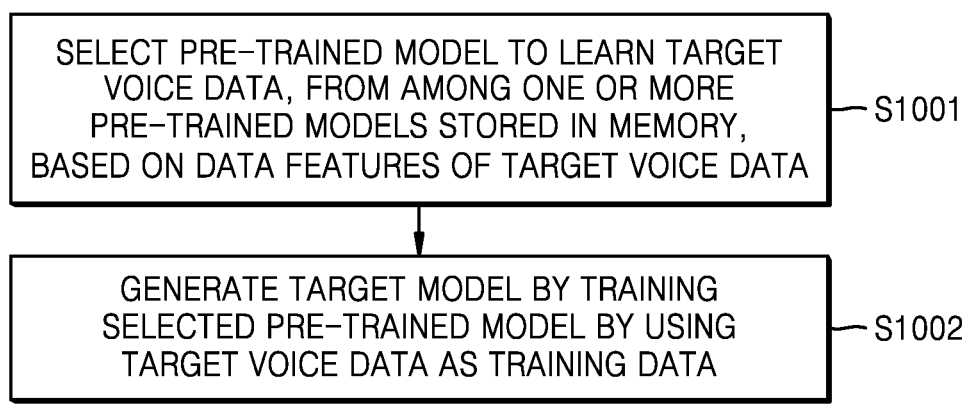
FIG. 10 is a flowchart for describing an example of selecting a pre-trained model according to an embodiment of the disclosure.
Figure 11:
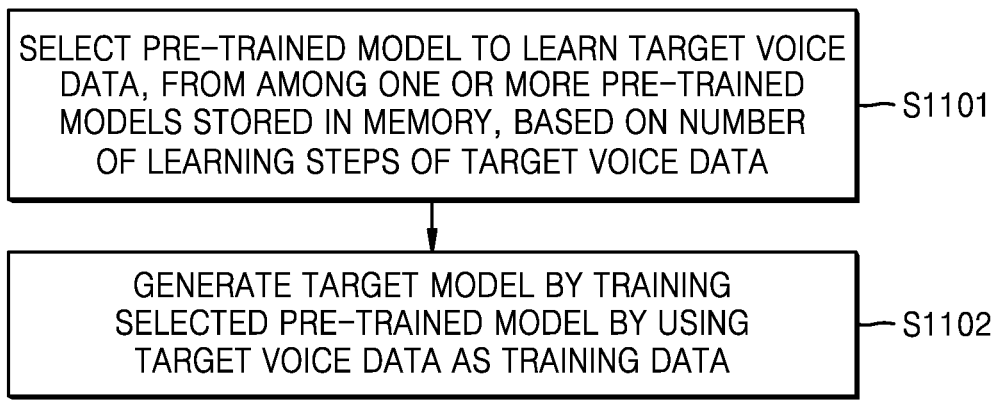
FIG. 11 is a flowchart for describing an example of selecting a pre-trained model according to an embodiment of the disclosure.

FIG. 10 is a flowchart for describing an example of selecting a pre-trained model, according to an embodiment of the disclosure. FIG. 11 is a flowchart for describing an example of selecting a pre-trained model, according to an embodiment of the disclosure. FIG. 12 is a table for describing an example of pre-trained models stored in a memory, according to an embodiment of the disclosure. FIG. 13 is a table for describing an example of selecting a pre-trained model, according to an embodiment of the disclosure.

The flowcharts of FIGS. 10 and 11 will now be described in conjunction with FIGS. 12 and 13.

Referring to FIG. 10, in operation S1001, the electronic device 100 may select a pre-trained model to learn target voice data, from among one or more pre-trained models stored in the memory 1700, based on data features of the target voice data.

For example, when the target voice data is data obtained by recording a voice of a female kid B, efficiency of learning may be increased by using a pre-trained model, which has pre-learned female kid's voice data having data features similar to those of the target voice data, as an initial state.

Referring to FIG. 12, the pre-trained model storage 1701 (see FIG. 4) of the electronic device 100 may store one or more pre-trained models. FIG. 12 shows an example of data stored according to an identifier (ID) of each pre-trained model.

For example, according to the ID of each pre-trained model, data on acoustic features (e.g., FS and BW), speaker features (e.g., Gend, Lang, F0/Pitch, and Tempo), and the number of pre-learned steps of voice data pre-learned by the pre-trained model may be stored.

FIG. 13 shows an example of data features and the number of learning steps of target voice data WAV2. For example, acoustic features (e.g., FS and BW) and speaker features (e.g., Gend, Lang, F0/Pitch, and Tempo) of the obtained target voice data WAV2 may be analyzed by the electronic device 100.

According to an embodiment of the disclosure, the electronic device 100 may select a pre-trained model capable of increasing efficiency of learning the target voice data, based on comparison between the analyzed data features of the target voice data (see FIG. 13) and the data features of the voice data pre-learned by the pre-trained models (see FIG. 12).

In operation S1002 of FIG. 10, the electronic device 100 may generate a target model by training the selected pre-trained model by using the target voice data as training data.

FIG. 11 shows an example of selecting a pre-trained model, based on the number of learning steps of target voice data, according to an embodiment of the disclosure.

Referring to FIG. 11, in operation S1101, the electronic device 100 may select a pre-trained model to learn target voice data, from among one or more pre-trained models stored in a memory, based on the number of learning steps of the target voice data.

Referring to FIG. 13, according to an embodiment of the disclosure, the number of learning steps of the target voice data WAV2 may be determined based on at least one of the data features of the target voice data WAV2 by the electronic device 100.

According to an embodiment of the disclosure, the electronic device 100 may select a pre-trained model from among the prestored pre-trained models (see FIG. 12), based on the number of learning steps of the target voice data WAV2 in FIG. 13.

Referring to FIG. 11, in operation S1102, the electronic device 100 may generate a target model by training the selected pre-trained model by using the target voice data as training data.

FIGS. 10 to 13 show further embodiments of the disclosure, and the disclosure is not limited thereto.

Figure 14:
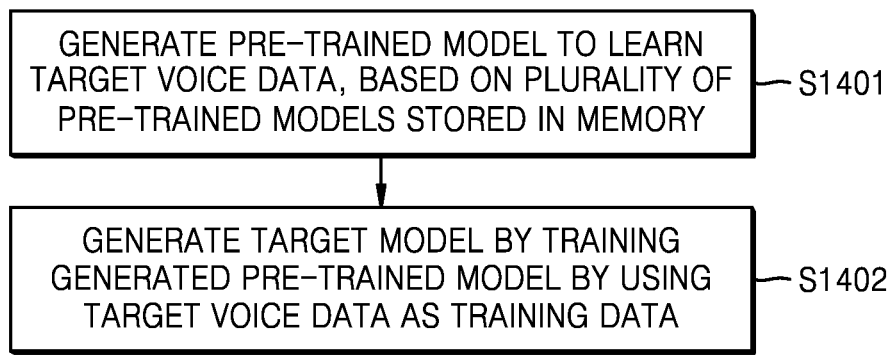
FIG. 14 is a flowchart for describing an example of generating a pre-trained model according to an embodiment of the disclosure.

FIG. 14 is a flowchart for describing an example of generating a pre-trained model, according to an embodiment of the disclosure.

Referring to FIG. 14, in operation S1401, the electronic device 100 may generate a pre-trained model to learn target voice data, based on a plurality of pre-trained models stored in a memory.

According to an embodiment of the disclosure, instead of merely using a pre-trained model prestored in a memory, the electronic device 100 may generate a new pre-trained model to be more appropriately trained based on the target voice data, based on the plurality of prestored pre-trained models. A detailed method thereof will be described below with reference to FIG. 15.

In operation S1402 of FIG. 14, the electronic device 100 may generate a target model by training the generated pre-trained model by using the target voice data as training data.

According to an embodiment of the disclosure, the electronic device 100 may additionally train the generated pre-trained model based on the target voice data by using the pre-trained model as an initial state.

Figure 15:
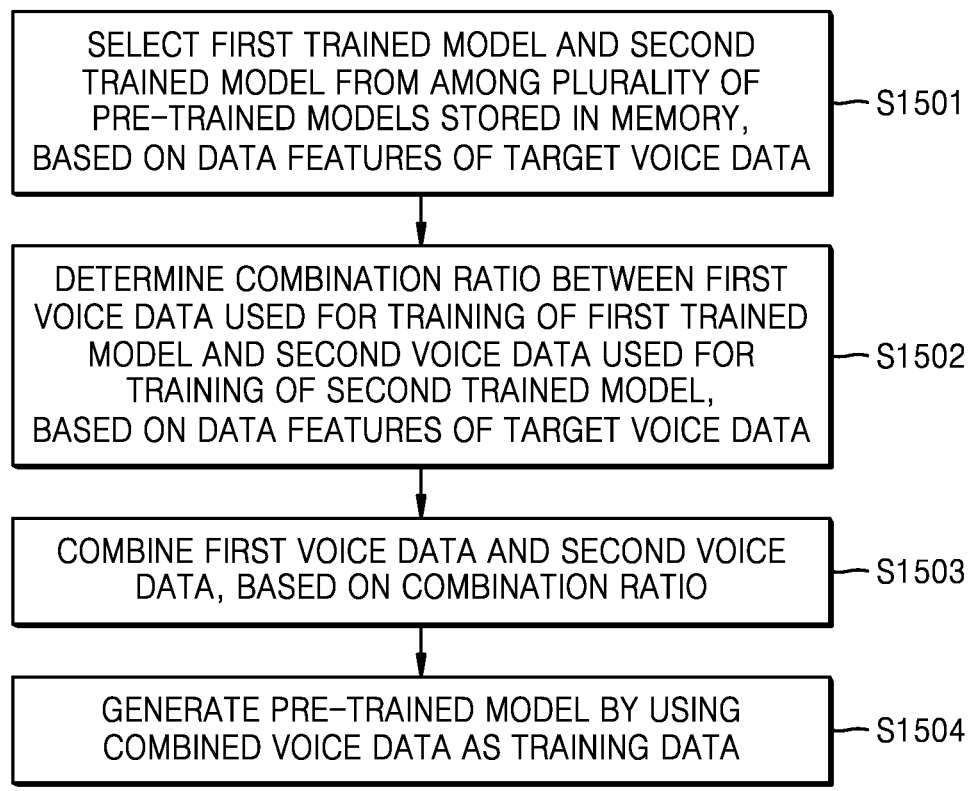
FIG. 15 is a flowchart for describing an example of a detailed method of generating a pre-trained model according to an embodiment of the disclosure.

FIG. 15 is a flowchart for describing an example of a detailed method of generating a pre-trained model, according to an embodiment of the disclosure.

Referring to FIG. 15, in operation S1501, the electronic device 100 may select a first trained model and a second trained model from among a plurality of pre-trained models stored in a memory, based on data features of target voice data.

According to an embodiment of the disclosure, the electronic device 100 may select a plurality of pre-trained models, which have pre-learned voice data having similar features, based on comparison between the data features of the target voice data and data features of voice data pre-learned by the plurality of pre-trained models stored in the memory.

In operation S1502 of FIG. 15, the electronic device 100 may determine a combination ratio between first voice data used for training of the first trained model and second voice data used for training of the second trained model, based on the data features of the target voice data. In operation S1503 of FIG. 15, the electronic device 100 may combine the first voice data and the second voice data, based on the combination ratio.

For example, upon determining a ratio of 7 to 3 as the combination ratio between the first voice data used for training of the first trained model and the second voice data used for training of the second trained model, the electronic device 100 may combine the first voice data and the second voice data in a ratio of 70% of the first voice data to 30% of the second voice data.

In operation S1504 of FIG. 15, the electronic device 100 may generate a pre-trained model by using the combined voice data as training data.

For example, the electronic device 100 may generate a pre-trained model by training an untrained initial-state model by using training data including 70% of the first voice data and 30% of the second voice data.

Figure 16:
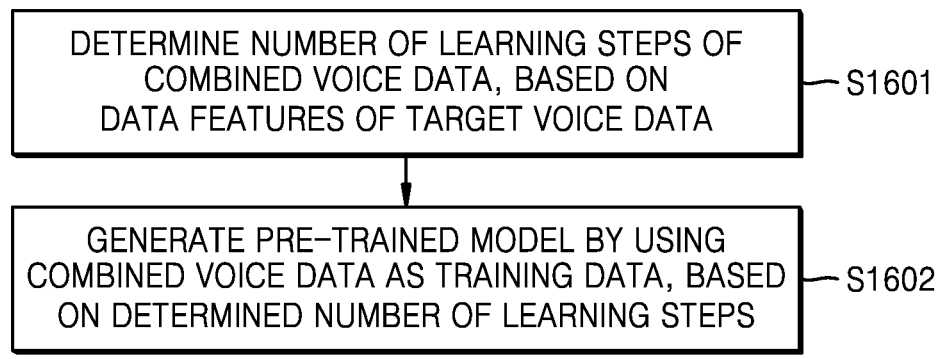
FIG. 16 is a flowchart for describing an example of a detailed method of generating a pre-trained model according to an embodiment of the disclosure.

FIG. 16 is a flowchart for describing an example of a detailed method of generating a pre-trained model, according to an embodiment of the disclosure.

Referring to FIG. 16, in operation S1601, the electronic device 100 may determine the number of learning steps of combined voice data, based on data features of target voice data.

For example, the electronic device 100 may determine the number of learning steps of the training data combined in operation S1503 of FIG. 15 to include 70% of the first voice data and 30% of the second voice data, based on the data features of the target voice data.

In operation S1602 of FIG. 16, the electronic device 100 may generate a pre-trained model by using the combined voice data as training data, based on the determined number of learning steps.

For example, the electronic device 100 may generate a pre-trained model by training an untrained initial-state model by using the training data including 70% of the first voice data and 30% of the second voice data through the number of learning steps determined in operation S1601.

FIGS. 14 to 16 merely show embodiments of the disclosure, and the disclosure is not limited thereto.

Figure 17:
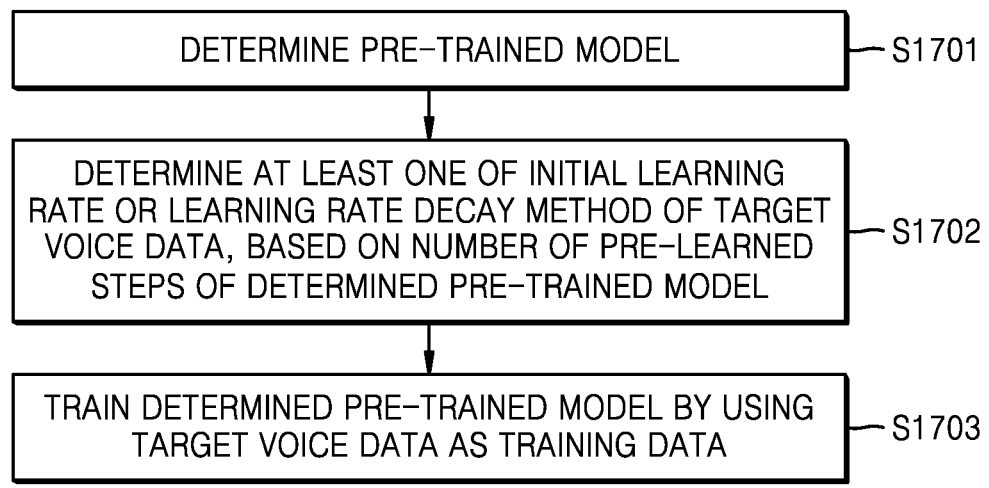
FIG. 17 is a flowchart for describing an example of determining an initial learning rate and a decay method, based on a pre-trained model according to an embodiment of the disclosure.

FIG. 17 is a flowchart for describing an example of determining an initial learning rate and a decay method, based on a pre-trained model, according to an embodiment of the disclosure.

According to an embodiment of the disclosure, the electronic device 100 may determine an initial learning rate for training a pre-trained model by using target voice data as training data, based on the number of pre-learned steps of the pre-trained model.

According to an embodiment of the disclosure, a learning rate may refer to a parameter indicating a degree by which data learned in a current learning step is to be reflected to weight values of a whole neural network when a trained model learns training data. The learning rate may refer to a parameter for determining a degree by which weight values of a whole neural network are to be adjusted due to a current learning step. For example, the weight values may greatly vary per learning step when the learning rate is high, and may slightly vary per learning step when the learning rate is low.

According to an embodiment of the disclosure, the learning rate may be set to decay whenever a learning step is iterated. The decay method according to an embodiment of the disclosure may refer to a method of decaying a learning rate whenever a learning step is iterated. For example, the decay method may refer to a method of decaying a learning rate in a certain ratio, or a method of decaying a learning rate differently for each learning period.

According to an embodiment of the disclosure, the initial learning rate may refer to a learning rate set in an initial learning step of a model. According to an embodiment of the disclosure, a final learning rate may refer to a learning rate set in a final learning step of a model.

Referring to FIG. 17, in operation S1701, the electronic device 100 may determine a pre-trained model.

As described above in relation to FIGS. 9 to 16, according to an embodiment of the disclosure, the pre-trained model determination module 1704 (see FIG. 4) may select a pre-trained model to learn target voice data, from among one or more prestored pre-trained models (operation S902), or generate a pre-trained model to learn target voice data, based on a plurality of prestored pre-trained models (operation S903).

In operation S1702 of FIG. 17, the electronic device 100 may determine at least one of an initial learning rate or a learning rate decay method of target voice data, based on the number of pre-learned steps of the determined pre-trained model.

According to an embodiment of the disclosure, the electronic device 100 may determine the initial learning rate of the target voice data, based on the number of pre-learned steps of the determined pre-trained model.

For example, when the determined pre-trained model is a model pre-trained through 200k learning steps and a final learning rate is 1, and when the determined pre-trained model is to be additionally trained based on the target voice data, the electronic device 100 may determine the initial learning rate of the target voice data as 1, based on the final learning rate of the pre-trained model.

According to an embodiment of the disclosure, the electronic device 100 may determine the learning rate decay method of the target voice data, based on the number of pre-learned steps of the determined pre-trained model. According to an embodiment of the disclosure, when the determined pre-trained model is to be additionally trained based on the target voice data, the electronic device 100 may maintain a learning rate decay method used for pre-training of the pre-trained model.

In operation S1703 of FIG. 17, the electronic device 100 may train the determined pre-trained model.

According to an embodiment of the disclosure, the electronic device 100 may generate a target model by training the pre-trained model by using the target voice data as training data, based on the determined initial learning rate.

According to an embodiment of the disclosure, the electronic device 100 may generate a target model by training the determined pre-trained model by using the target voice data as training data, based on the determined learning rate decay method.

Figure 18:
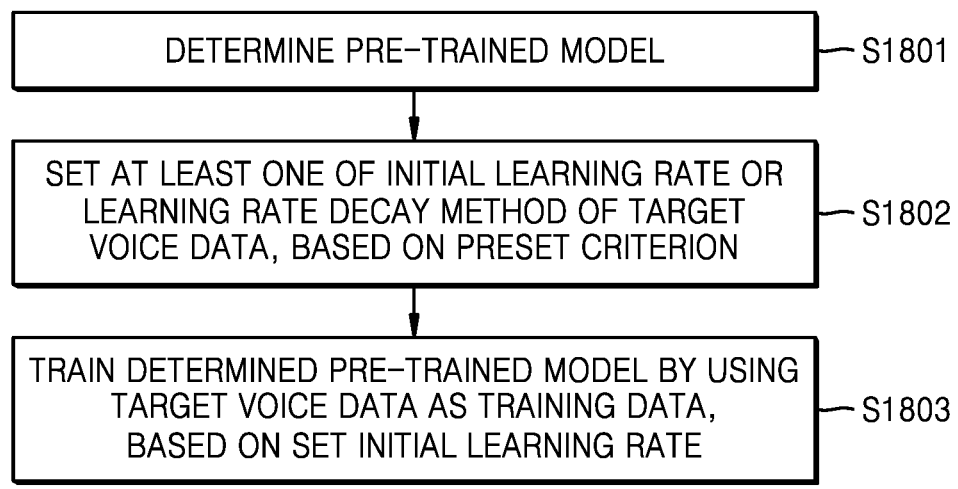
FIG. 18 is a flowchart for describing an example of setting an initial learning rate and a decay method according to an embodiment of the disclosure.

FIG. 18 is a flowchart for describing an example of setting an initial learning rate and a decay method, according to an embodiment of the disclosure.

Referring to FIG. 18, in operation S1801, the electronic device 100 may determine a pre-trained model.

As described above in relation to FIGS. 9 to 16, according to an embodiment of the disclosure, the pre-trained model determination module 1704 (see FIG. 4) may select a pre-trained model to learn target voice data, from among one or more prestored pre-trained models (operation S902), or generate a pre-trained model to learn target voice data, based on a plurality of prestored pre-trained models (operation S903).

In operation S1802 of FIG. 18, the electronic device 100 may set at least one of an initial learning rate or a learning rate decay method of target voice data, based on a preset criterion.

According to an embodiment of the disclosure, the electronic device 100 may set the initial learning rate for training the pre-trained model by using the target voice data as training data, based on the preset criterion.

According to an embodiment of the disclosure, the electronic device 100 may set the initial learning rate as a value less than a final learning rate of the determined pre-trained model within a preset range. In this case, a generated target model may generate output data having a lower pronunciation error rate compared to a case when the initial learning rate is set as the final learning rate of the pre-trained model.

For example, when the determined pre-trained model is a model pre-trained through 200k learning steps and the final learning rate is 1, and when the determined pre-trained model is to be additionally trained based on the target voice data, the electronic device 100 may set the initial learning rate of the target voice data as 0.4. As such, a target model for generating output data having a lower pronunciation error rate may be generated.

According to an embodiment of the disclosure, to generate a target model having a much lower pronunciation error rate, i.e., a high performance in pronunciation accuracy, the electronic device 100 may set the initial learning rate as a value less than the final learning rate of the determined pre-trained model within the preset range.

For example, the electronic device 100 may set the initial learning rate as a value less than the final learning rate of the determined pre-trained model within the preset range, based on a preset priority in generating a target model having a high performance in pronunciation accuracy.

For example, the electronic device 100 may set the initial learning rate as a value less than the final learning rate of the determined pre-trained model within the preset range, based on a user input for requesting to generate a target model having a high performance in pronunciation accuracy.

According to an embodiment of the disclosure, upon determining that the number of pre-learned steps of the determined pre-trained model is less than a preset threshold value, the electronic device 100 may set the initial learning rate of the target voice data as a value less than the final learning rate of the pre-trained model within the preset range. This is because, when the number of pre-learned steps of the pre-trained model is quite small, the final learning rate according to the number of pre-learned steps is estimated as a quite large value.

According to an embodiment of the disclosure, the electronic device 100 may set the initial learning rate as a value greater than the final learning rate of the determined pre-trained model within a preset range. In this case, a generated target model may generate output data having a higher similarity to a target voice compared to a case when the initial learning rate is set as the final learning rate of the pre-trained model.

For example, when the determined pre-trained model is a model pre-trained through 1000k learning steps and the final learning rate is 0.4, and when the determined pre-trained model is to be additionally trained based on the target voice data, the electronic device 100 may set the initial learning rate of the target voice data as 1. As such, a target model for generating output data having a high similarity to a target voice may be generated.

According to an embodiment of the disclosure, to generate a target model having a high performance in similarity to a target voice, the electronic device 100 may set the initial learning rate as a value greater than the final learning rate of the determined pre-trained model within the preset range.

For example, the electronic device 100 may set the initial learning rate as a value greater than the final learning rate of the determined pre-trained model within the preset range, based on a preset priority in generating a target model having a high performance in similarity to a target voice.

For example, the electronic device 100 may set the initial learning rate as a value greater than the final learning rate of the determined pre-trained model within the preset range, based on a user input for requesting to generate a target model having a high performance in similarity to a target voice.

According to an embodiment of the disclosure, upon determining that the number of pre-learned steps of the determined pre-trained model is greater than a preset threshold value, the electronic device 100 may set the initial learning rate of the target voice data as a value greater than the final learning rate of the pre-trained model within the preset range. This is because, when the number of pre-learned steps of the pre-trained model is quite large, the final learning rate according to the number of pre-learned steps is estimated as a quite small value.

According to an embodiment of the disclosure, the electronic device 100 may set a learning rate to decay according to a preset decay method whenever a learning step is iterated.

According to an embodiment of the disclosure, the electronic device 100 may set a learning rate decay method of the target voice data, based on a preset criterion. According to an embodiment of the disclosure, the electronic device 100 may set the decay method to decay faster within a preset range compared to a learning rate of the determined pre-trained model. According to an embodiment of the disclosure, the electronic device 100 may set the decay method differently for each learning period. As such, a generated target model may generate output data having a lower pronunciation error rate compared to a case when a learning rate decay method of the pre-trained model is maintained.

For example, when the determined pre-trained model is pre-trained through a total of 200k learning steps by decaying a learning rate by 50% per 100k learning steps, to additionally train the pre-trained model based on the target voice data, the electronic device 100 may set the learning rate to decay by 50% per 10k learning steps. For example, the electronic device 100 may set the learning rate to decay by 50% per 10k learning steps in a learning period of initial 10k learning steps and to decay by 10% per 10k learning steps in subsequent learning periods.

According to an embodiment of the disclosure, the electronic device 100 may set the decay method to decay slower within a preset range compared to the learning rate of the determined pre-trained model. The electronic device 100 may set the decay method differently for each learning period. As such, a generated target model may generate output data having a higher similarity to a target speaker compared to a case when a learning rate decay method of the pre-trained model is maintained.

For example, when the determined pre-trained model is pre-trained through a total of 200k learning steps by decaying a learning rate by 50% per 100k learning steps, to additionally train the pre-trained model based on the target voice data, the electronic device 100 may set the learning rate to decay by 50% per 200k learning steps. For example, the electronic device 100 may set the learning rate to decay by 50% per 200k learning steps in a learning period of initial 10k learning steps and to decay by 10% per 200k learning steps in subsequent learning periods.

For example, to additionally train the pre-trained model based on the target voice data, the electronic device 100 may set the learning rate to increase, i.e., decay in a negative direction, in a learning period of an initial certain range and to decay in subsequent learning periods.

For example, to additionally train the pre-trained model based on the target voice data, the electronic device 100 may set the learning rate in such a manner that periods where the learning rate increases, i.e., decays in a negative direction, and periods where the learning rate decays are alternated.

According to an embodiment of the disclosure, the decay method may be calculated using a certain algorithm or program, and is not limited to the above-described examples.

In operation S1803 of FIG. 18, the electronic device 100 may train the determined pre-trained model.

According to an embodiment of the disclosure, the electronic device 100 may generate a target model by training the pre-trained model by using the target voice data as training data, based on the set initial learning rate.

According to an embodiment of the disclosure, the electronic device 100 may generate a target model by training the pre-trained model by using the target voice data as training data, based on the set learning rate decay method.

According to an embodiment of the disclosure, the electronic device 100 may set a first initial learning rate corresponding to a first learning period from among a determined total number of learning steps, and a second initial learning rate corresponding to a second learning period after the first learning period.

For example, to train the pre-trained model through a total of 2000k learning steps, the electronic device 100 may set the first initial learning rate for the first learning period, e.g., initial 100k learning steps, and set the second initial learning rate decayed in a preset range, for the second learning period, e.g., subsequent learning steps.

FIGS. 17 and 18 are merely for describing examples, and the disclosure is not limited thereto.

FIGS. 19 to 26 show examples of a user interface of the electronic device 100 according to an embodiment of the disclosure.

For example, a TTS model, i.e., a target model, for providing a TTS service by using a voice similar to a target voice desired by a user, e.g., a voice of a specific speaker such as a celebrity or father, may be generated by executing an application.

FIGS. 19, 20, and 23 to 26 show examples of a launch screen of the application for generating the target model.

Figure 19:
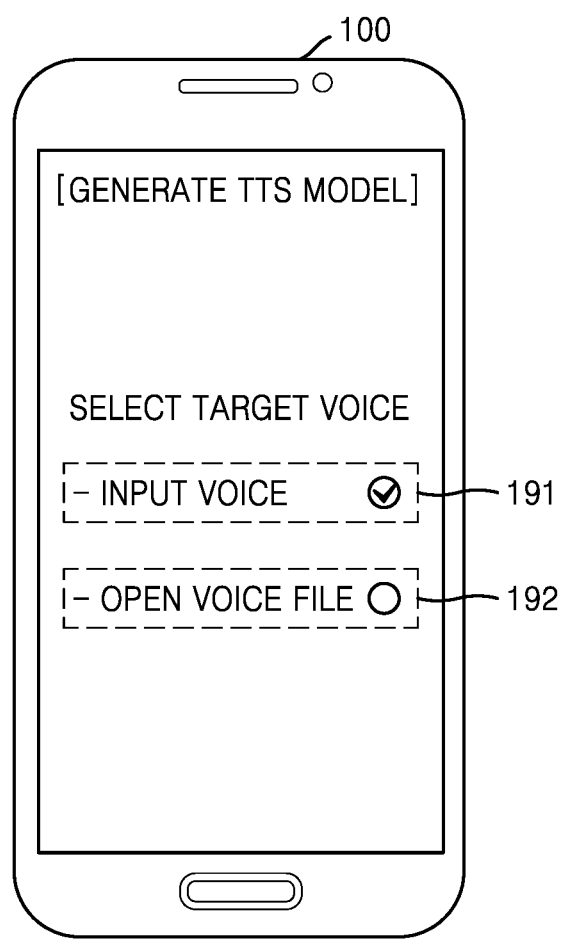
FIG. 19 is a diagram for describing an example of a user interface for obtaining target voice data according to an embodiment of the disclosure.

Referring to FIG. 19, according to an embodiment of the disclosure, to obtain target voice data, the electronic device 100 may display a user interface for selecting a menu such as 'Input Voice' 191 or 'Open Voice File' 192.

According to an embodiment of the disclosure, when 'Input Voice' 191 is selected based on a user input, the electronic device 100 may obtain an uttered voice of the user through the microphone 1620 (see FIG. 34).

Figure 20:
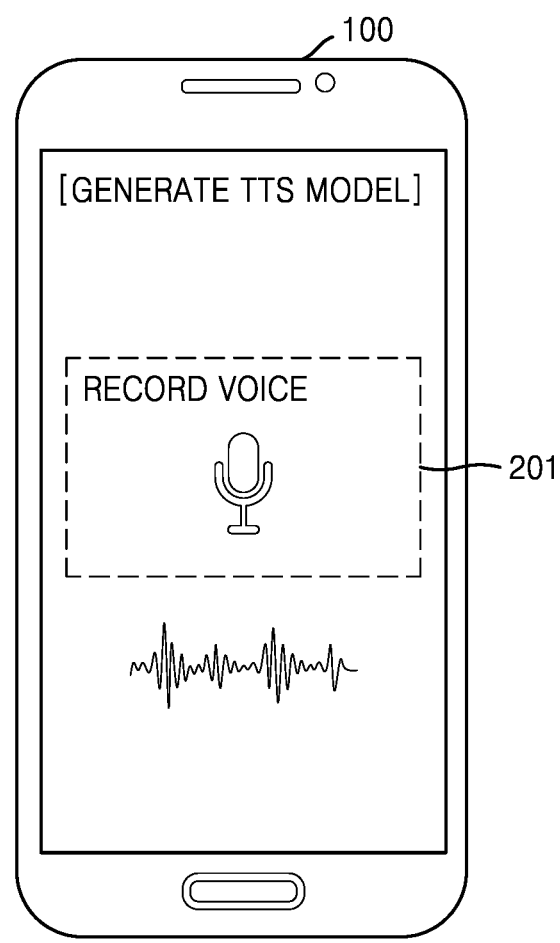
FIG. 20 is a diagram for describing an example of obtaining target voice data according to an embodiment of the disclosure.

Referring to FIG. 20, the electronic device 100 may display a screen 201 for inducing an utterance of the user. The electronic device 100 may obtain an uttered voice of the user through the microphone 1620 (see FIG. 34).

For example, the electronic device 100 may provide certain sentence examples to be read by the user, and obtain an uttered voice of the user through the microphone 1620 (see FIG. 34), but is not limited thereto.

According to an embodiment of the disclosure, when 'Open Voice File' 192 is selected on the user interface of FIG. 19 based on a user input, the electronic device 100 may obtain voice data prestored in the memory 1700 (see FIG. 34).

According to an embodiment of the disclosure, the electronic device 100 may receive the target voice data through the communicator 1500 (see FIG. 34) from an external device (not shown).

According to an embodiment of the disclosure, the electronic device 100 may obtain the target voice data based on an utterance input of the specific speaker extracted from voice data stored during a call connection.

Figure 21:
FIG. 21 is a diagram for describing an example of obtaining target voice data according to an embodiment of the disclosure.

Referring to FIG. 21, when a phone call with a preset specific person is connected, the electronic device 100 may provide a notification message, e.g., 'Recording Call' 211, or notification sound to record the call with the specific person.

For example, the electronic device 100 may record a call in response to reception of a preset user input during the call.

According to an embodiment of the disclosure, the electronic device 100 may obtain the target voice data based on an utterance input of the specific speaker extracted from broadcast content received through the broadcast receiver 1530 (see FIG. 34) of the electronic device 100 or a broadcast receiver (not shown) of an external display device 300.

Figure 22:
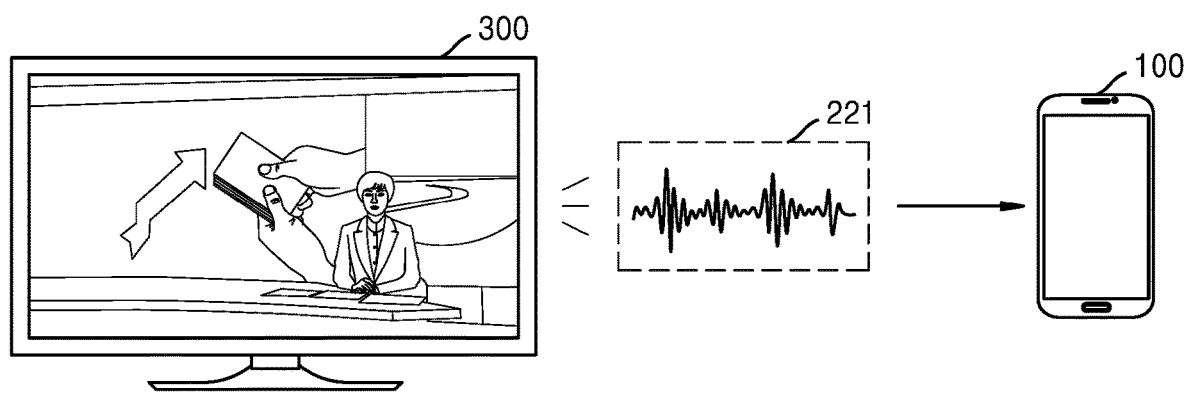
FIG. 22 is a diagram for describing an example of obtaining target voice data according to an embodiment of the disclosure.

Referring to FIG. 22, when a voice of a preset specific person is included in broadcast content, the external display device 300 may store voice data 221 of the specific person and transmit the stored voice data 221 to the electronic device 100.

For example, the external display device 300 may perform image recognition to recognize a face included in the broadcast content, and store the voice data 221 of the specific person and transmit the stored voice data 221 to the electronic device 100 when the preset specific person is included in the broadcast content.

For example, the external display device 300 may store the voice data 221 of broadcast content and transmit the stored voice data 221 to the electronic device 100 in response to reception of a preset user input while the broadcast content is being displayed.

For example, the external display device 300 may store the voice data 221 of a video and transmit the stored voice data 221 to the electronic device 100 when the preset specific person is included in the video or in response to reception of a preset user input while the video is being reproduced, but is not limited thereto.

For example, when content includes subtitle data, the external display device 300 may transmit the voice data 221 and the subtitle data corresponding to the voice data 221, to the electronic device 100. The voice data 221 and the subtitle data corresponding to the voice data 221 may be used as training data.

Figure 23:
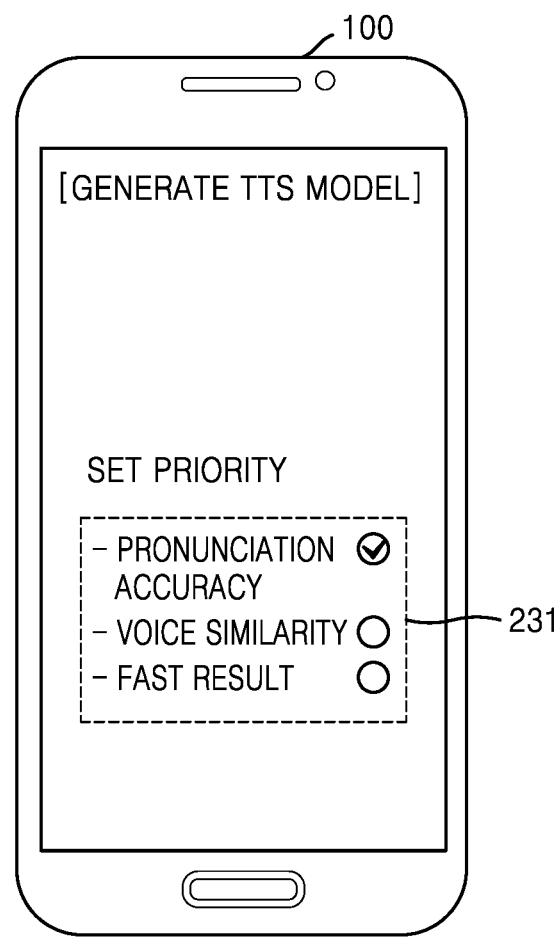
FIG. 23 is a diagram for describing an example of a user interface for setting a priority of a user in generating a TTS model according to an embodiment of the disclosure.

FIG. 23 is a diagram for describing an example of a user interface for setting a priority of a user in generating a TTS model, according to an embodiment of the disclosure.

Referring to FIG. 23, the electronic device 100 may display a priority setting screen 231 including, for example, i) pronunciation accuracy, ii) voice similarity, and iii) fast result.

According to an embodiment of the disclosure, the electronic device 100 may select a method of generating a TTS model that best matches a user-desired priority, according to a priority set based on a user input.

For example, when a user input for setting a priority for pronunciation accuracy is received, the electronic device 100 may determine data features including a data amount of obtained target voice data, and display a screen for inducing additional input of voice data when necessary. For example, the electronic device 100 may additionally obtain target voice data by displaying a user interface for asking whether other data obtained by recording a voice of a specific person is providable, or by displaying a user interface for inducing a direct utterance input of a target speaker when possible.

For example, when a user input for setting a priority for voice similarity is received, the electronic device 100 may learn the target voice data by increasing the number of learning steps of the target voice data.

For example, when a user input for setting a priority for fast result is received, the electronic device 100 may determine a method of determining a pre-trained model, as a method of selecting one of pre-trained models prestored in a memory (see operation S902 of FIG. 9).

Figure 24:
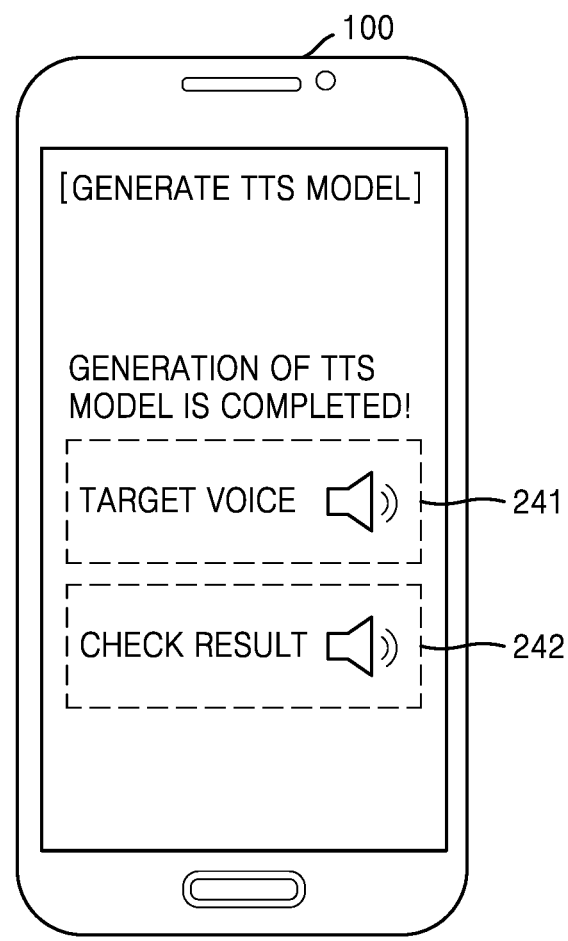
FIG. 24 is a diagram for describing an example of a user interface for checking a result of generating a TTS model according to an embodiment of the disclosure.

FIG. 24 is a diagram for describing an example of a user interface for checking a result of generating a TTS model, according to an embodiment of the disclosure.

FIG. 24 shows an example of a screen used by the electronic device 100 to notify a user that generation of a TTS model is completed.

For example, when a user input for selecting a 'Target Voice' 241 is received, the electronic device 100 may reproduce target voice data through the sound outputter 1230 (see FIG. 34).

For example, when a user input for selecting 'Check Result' 242 is received, the electronic device 100 may reproduce output data of a generated TTS model through the sound outputter 1230 (see FIG. 34).

Figure 25:
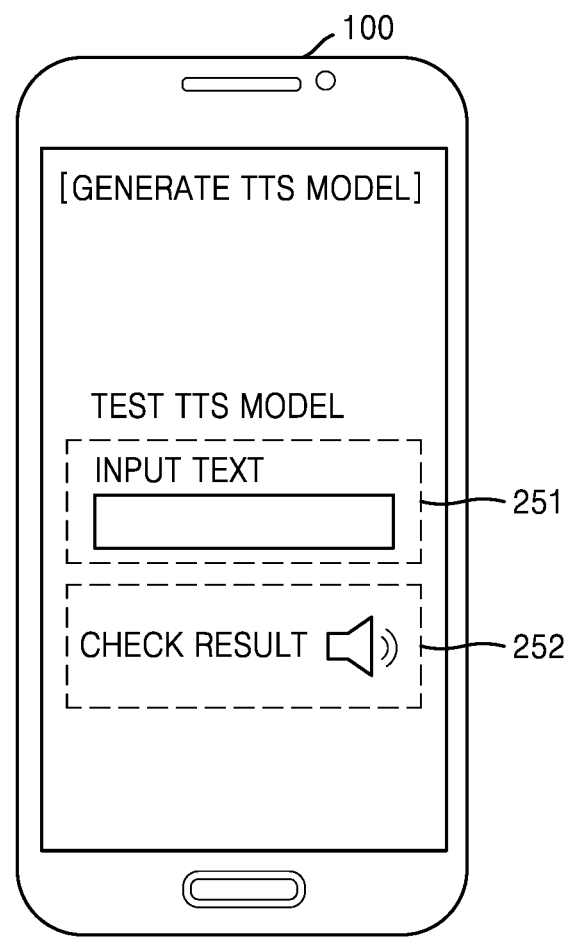
FIG. 25 is a diagram for describing an example of a user interface for testing a TTS model according to an embodiment of the disclosure.

FIG. 25 is a diagram for describing an example of a user interface for testing a TTS model, according to an embodiment of the disclosure.

FIG. 25 shows an example of a user interface provided to a user to test a voice output from a generated TTS model.

For example, the electronic device 100 may display a region 251 for receiving certain text input. When text is input on the displayed region 251, the electronic device 100 may generate output data by inputting the input text to the generated TTS model.

For example, when a user input for selecting 'Check Result' 252 is received, the electronic device 100 may output the generated output data through the sound outputter 1230 (see FIG. 34).

Figure 26:
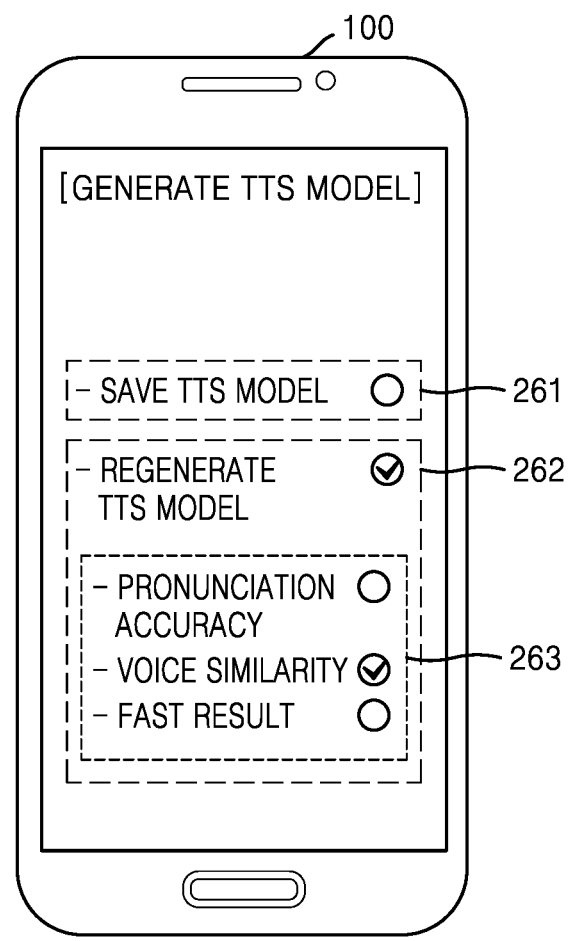
FIG. 26 is a diagram for describing an example of a user interface for selecting regeneration of a TTS model according to an embodiment of the disclosure.

FIG. 26 is a diagram for describing an example of a user interface for selecting regeneration of a TTS model, according to an embodiment of the disclosure.

For example, referring to FIG. 26, when a user input for selecting 'Save TTS Model' 261 is received, the electronic device 100 may store a generated TTS model in the memory 1700 (see FIG. 34).

For example, when a user input for selecting 'Regenerate TTS Model' 262 is received, the electronic device 100 may regenerate a TTS model.

The electronic device 100 may display a priority setting screen 263 including, for example, i) pronunciation accuracy, ii) voice similarity, and iii) fast result.

As described above in relation to FIG. 23, the electronic device 100 may reselect a method of generating a TTS model that best matches a user-desired priority, according to a priority set based on a user input, and regenerate a TTS model.

For example, when a user input for setting a priority for voice similarity is received, the electronic device 100 may additionally learn the target voice data by increasing the number of learning steps of the target voice data.

In this case, the electronic device 100 may display a screen for notifying a user that, for example, voice similarity to a target voice may be increased but pronunciation accuracy may be reduced.

For example, the electronic device 100 may regenerate a TTS model by additionally learning the target voice data, in response to reception of a user input for accepting that voice similarity may be increased but pronunciation accuracy may be reduced.

FIGS. 19 to 26 merely show embodiments of the disclosure, and the disclosure is not limited thereto.

Figure 27:
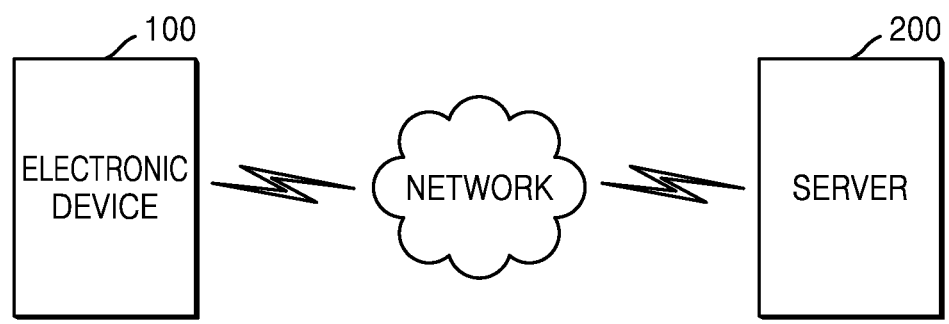
FIG. 27 is a diagram for describing operations of an electronic device and a server according to an embodiment of the disclosure.

FIG. 27 is a diagram for describing operations of the electronic device 100 and a server 200, according to an embodiment of the disclosure.

According to an embodiment of the disclosure, the electronic device 100 may transmit and receive data to and from the external server 200 through a communication network.

Although operations performed by the electronic device 100 are described in FIG. 1 to FIG. 26, the disclosure is not limited thereto. For example, at least some operations may be performed by the electronic device 100, at least some operations may be performed by the external server 200 at the request of the electronic device 100, and the electronic device 100 may receive the operation results from the external server 200.

FIGS. 28 to 32 show examples of operations performed by the electronic device 100 and the external server 200 to provide a TTS service.

The descriptions provided in detail above in relation to FIGS. 1 to 26 will not be repeated herein.

Figure 28:
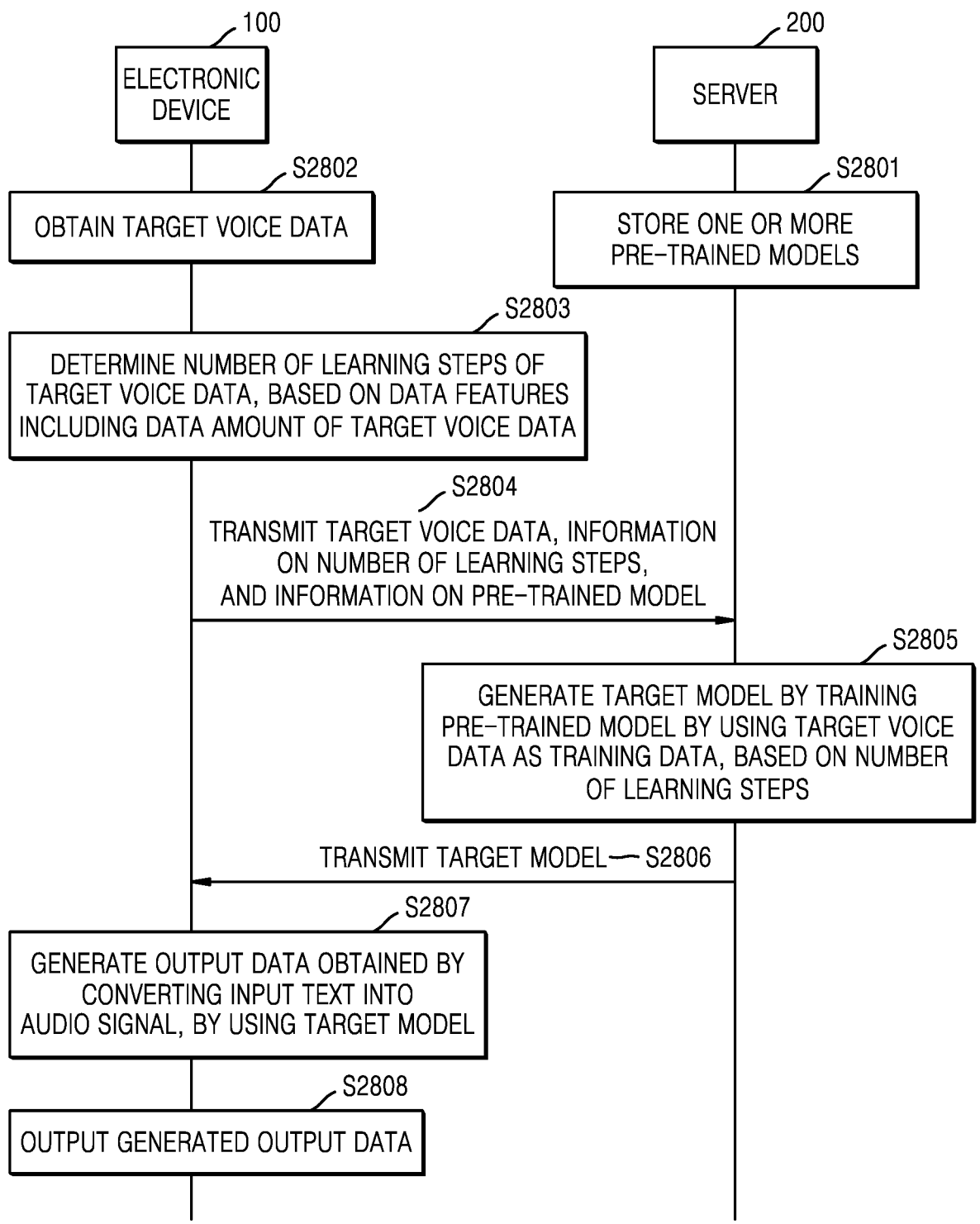
FIG. 28 is a flowchart for describing an example of operations of an electronic device and a server according to an embodiment of the disclosure.

FIG. 28 is a flowchart for describing an example of operations of the electronic device 100 and the server 200, according to an embodiment of the disclosure.

FIG. 28 shows an example in which the server 200 stores pre-trained models, and generates a target model at the request of the electronic device 100.

In operation S2801 of FIG. 28, the server 200 may store one or more pre-trained models.

According to an embodiment of the disclosure, the server 200 may generate and store pre-trained models. According to an embodiment of the disclosure, the server 200 may receive and store pre-trained models generated by another device (not shown).

In operation S2802 of FIG. 28, the electronic device 100 may obtain target voice data.

In operation S2803 of FIG. 28, the electronic device 100 may determine the number of learning steps of the target voice data, based on data features including a data amount of the target voice data.

In operation S2804 of FIG. 28, the electronic device 100 may transmit, to the server 200, the target voice data, information on the number of learning steps, and information on a pre-trained model.

According to an embodiment of the disclosure, the electronic device 100 may request the server 200 to generate a TTS model for providing a TTS service with a voice similar to the target voice data.

According to an embodiment of the disclosure, the electronic device 100 may determine the information on a pre-trained model, based on the data features and/or the number of learning steps of the target voice data, and provide the determined information on a pre-trained model to the server 200.

According to an embodiment of the disclosure, the information on a pre-trained model may include criterion information for selecting a pre-trained model appropriate to learn the target voice data. For example, the electronic device 100 may provide, to the server 200, criterion information for determining a pre-trained model which has pre-learned voice data based on utterances of speakers of the same gender and language as and of similar ages to a speaker of the target voice data, based on speaker features from among the data features of the target voice data.

In operation S2805 of FIG. 28, the server 200 may generate a target model by training a pre-trained model by using the target voice data as training data, based on the number of learning steps.

According to an embodiment of the disclosure, to generate the target model, the server 200 may initially determine a pre-trained model to learn the target voice data, based on the information on a pre-trained model received from the electronic device 100. According to an embodiment of the disclosure, the server 200 may determine the pre-trained model by selecting a pre-trained model from among the stored pre-trained models or by generating a new pre-trained model, based on the stored pre-trained models.

According to an embodiment of the disclosure, the server 200 may generate the target model by training the determined pre-trained model based on the target voice data, based on the information on the number of learning steps received from the electronic device 100.

In operation S2806 of FIG. 28, the server 200 may transmit the target model to the electronic device 100.

In operation S2807 of FIG. 28, the electronic device 100 may generate output data obtained by converting input text into an audio signal, by using the target model. In operation S2808 of FIG. 28, the electronic device 100 may output the generated output data.

According to an embodiment of the disclosure, the electronic device 100 may provide a TTS service to a user by receiving the target model generated by the server 200.

Figure 29:
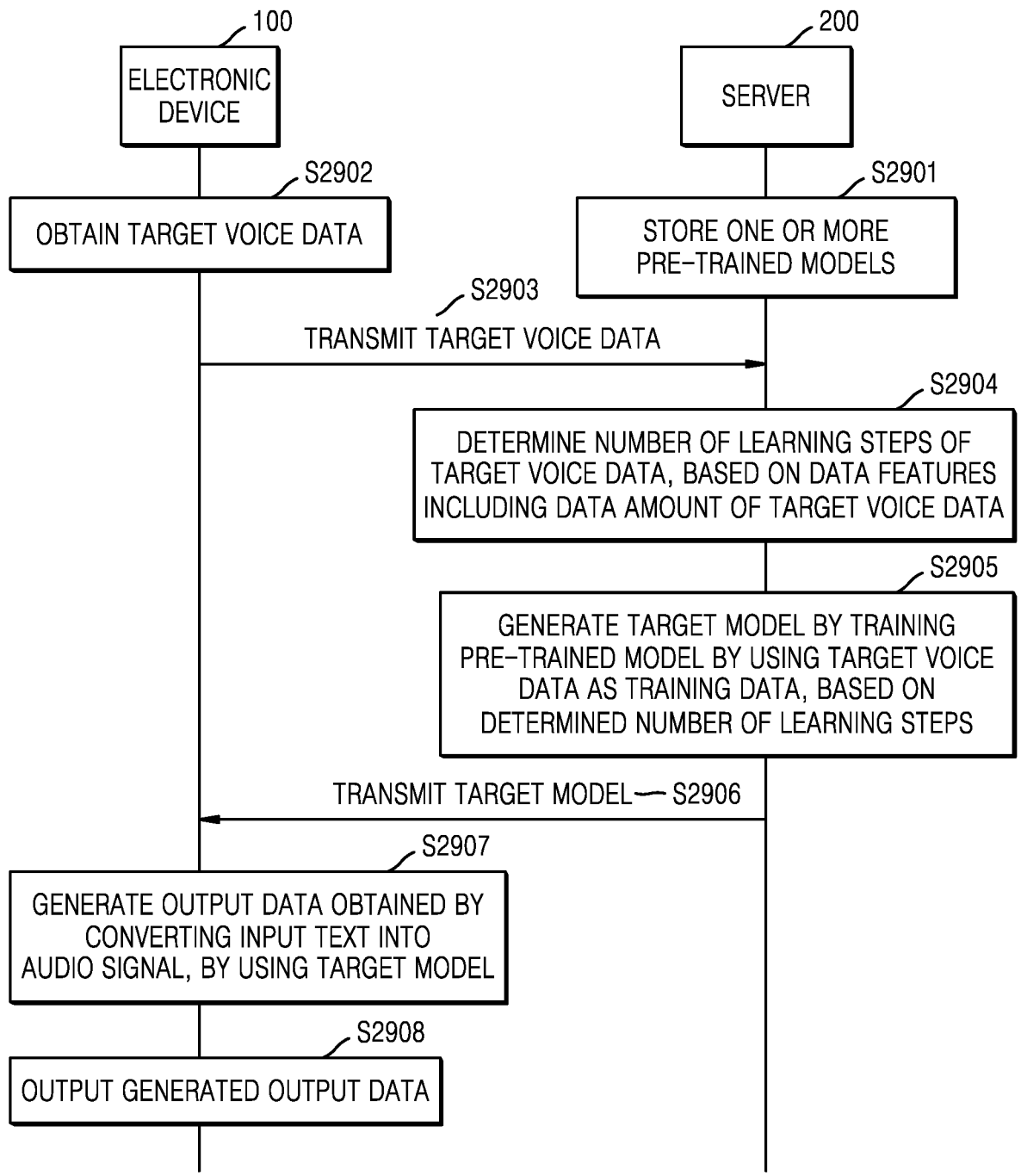
FIG. 29 is a flowchart for describing an example of operations of an electronic device and a server according to an embodiment of the disclosure.

FIG. 29 is a flowchart for describing an example of operations of the electronic device 100 and the server 200, according to an embodiment of the disclosure.

FIG. 29 shows an example in which the server 200 stores pre-trained models, and determines the number of learning steps of target voice data and generates a target model at the request of the electronic device 100.

In operation S2901 of FIG. 29, the server 200 may store one or more pre-trained models.

In operation S2902 of FIG. 29, the electronic device 100 may obtain target voice data.

In operation S2903 of FIG. 29, the electronic device 100 may transmit the target voice data to the server 200.

According to an embodiment of the disclosure, the electronic device 100 may request the server 200 to generate a TTS model for providing a TTS service with a voice similar to the target voice data.

In operation S2904 of FIG. 29, the server 200 may determine the number of learning steps of the target voice data, based on data features including a data amount of the target voice data.

In operation S2905 of FIG. 29, the server 200 may generate a target model by training a pre-trained model by using the target voice data as training data, based on the determined number of learning steps.

According to an embodiment of the disclosure, to generate the target model, the server 200 may initially determine a pre-trained model to learn the target voice data, based on the data features of the target voice data. According to an embodiment of the disclosure, the server 200 may determine the pre-trained model by selecting a pre-trained model from among the stored pre-trained models or by generating a new pre-trained model, based on the stored pre-trained models.

According to an embodiment of the disclosure, the server 200 may generate the target model by additionally training the determined pre-trained model based on the target voice data by using the pre-trained model as an initial state, based on the determined number of learning steps. In operation S2906 of FIG. 29, the server 200 may transmit the target model to the electronic device 100.

In operation S2907 of FIG. 29, the electronic device 100 may generate output data obtained by converting input text into an audio signal, by using the target model. In operation S2908 of FIG. 29, the electronic device 100 may output the generated output data.

According to an embodiment of the disclosure, the electronic device 100 may provide a TTS service to a user by receiving the target model generated by the server 200.

Figure 30:
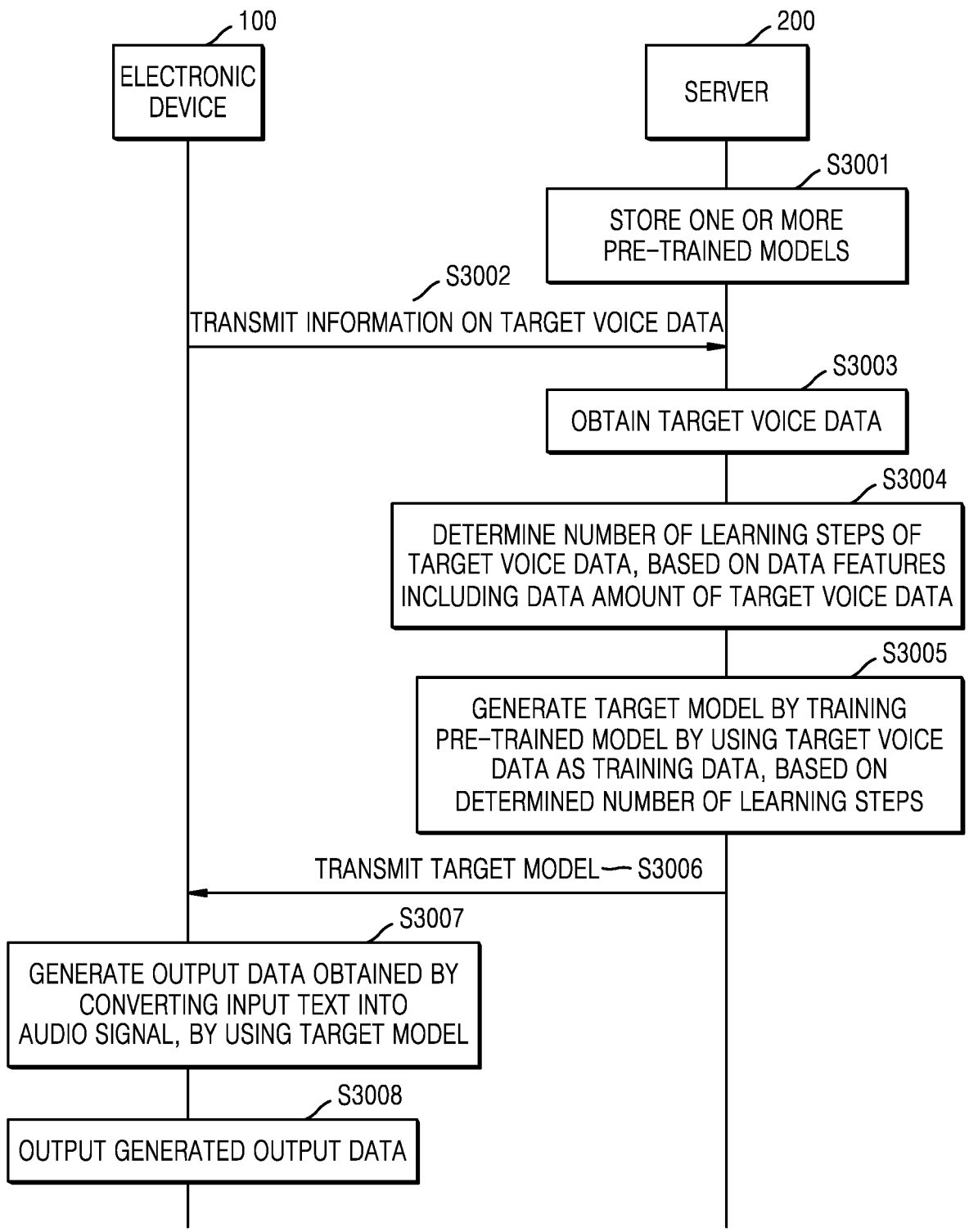
FIG. 30 is a flowchart for describing an example of operations of an electronic device and a server according to an embodiment of the disclosure.

FIG. 30 is a flowchart for describing an example of operations of the electronic device 100 and the server 200, according to an embodiment of the disclosure.

FIG. 30 shows an example in which the server 200 stores pre-trained models, and obtains target voice data, determines the number of learning steps, and generates a target model at the request of the electronic device 100.

In operation S3001 of FIG. 30, the server 200 may store one or more pre-trained models.

In operation S3002 of FIG. 30, the electronic device 100 may transmit information on target voice data to the server 200.

According to an embodiment of the disclosure, the electronic device 100 may request the server 200 to generate a TTS model for providing a TTS service with a voice similar to a target voice, based on the information on target voice data.

According to an embodiment of the disclosure, the information on target voice data may be speaker information and include the name of a specific person, or the gender, age, and language of a speaker.

For example, the information on target voice data may include the name of a specific person, e.g., the name of a celebrity.

According to an embodiment of the disclosure, the electronic device 100 may obtain the information on target voice data, based on a user input. The electronic device 100 may obtain the information on target voice data as a result of executing a certain application.

In operation S3003 of FIG. 30, the server 200 may obtain target voice data.

According to an embodiment of the disclosure, the server 200 may obtain the target voice data, based on the information on target voice data (e.g., the name of a celebrity).

Figure 35:
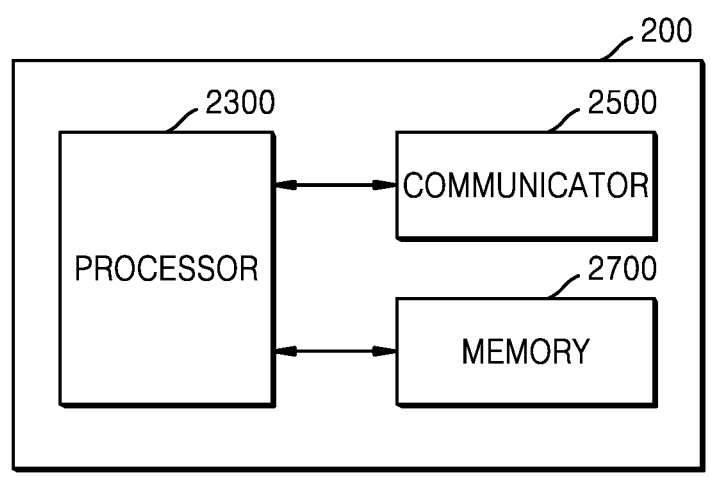
FIG. 35 is a block diagram of a server according to an embodiment of the disclosure.

According to an embodiment of the disclosure, the server 200 may store a plurality of pieces of voice data in a memory 2700 (see FIG. 35). The server 200 may obtain voice data from an external device (not shown), based on the information on target voice data.

For example, the server 200 may previously provide a stored voice data list to the electronic device 100, and receive the information on target voice data from the electronic device 100. The server 200 may obtain the target voice data, based on the information on target voice data, and generate a target model for providing a TTS service with a voice similar to a target voice.

In operation S3004 of FIG. 30, the server 200 may determine the number of learning steps of the target voice data, based on data features including a data amount of the target voice data.

In operation S3005 of FIG. 30, the server 200 may generate a target model by training a pre-trained model by using the target voice data as training data, based on the determined number of learning steps.

According to an embodiment of the disclosure, to generate the target model, the server 200 may initially determine a pre-trained model to learn the target voice data, based on the data features of the target voice data. According to an embodiment of the disclosure, the server 200 may determine the pre-trained model by selecting a pre-trained model from among the stored pre-trained models or by generating a new pre-trained model, based on the stored pre-trained models.

According to an embodiment of the disclosure, the server 200 may generate the target model by additionally training the determined pre-trained model based on the target voice data by using the pre-trained model as an initial state, based on the determined number of learning steps.

In operation S3006 of FIG. 30, the server 200 may transmit the generated target model to the electronic device 100.

In operation S3007 of FIG. 30, the electronic device 100 may generate output data obtained by converting input text into an audio signal, by using the target model. In operation S3008 of FIG. 30, the electronic device 100 may output the generated output data.

According to an embodiment of the disclosure, the electronic device 100 may provide a TTS service to a user by receiving the target model generated by the server 200.

Figure 31:
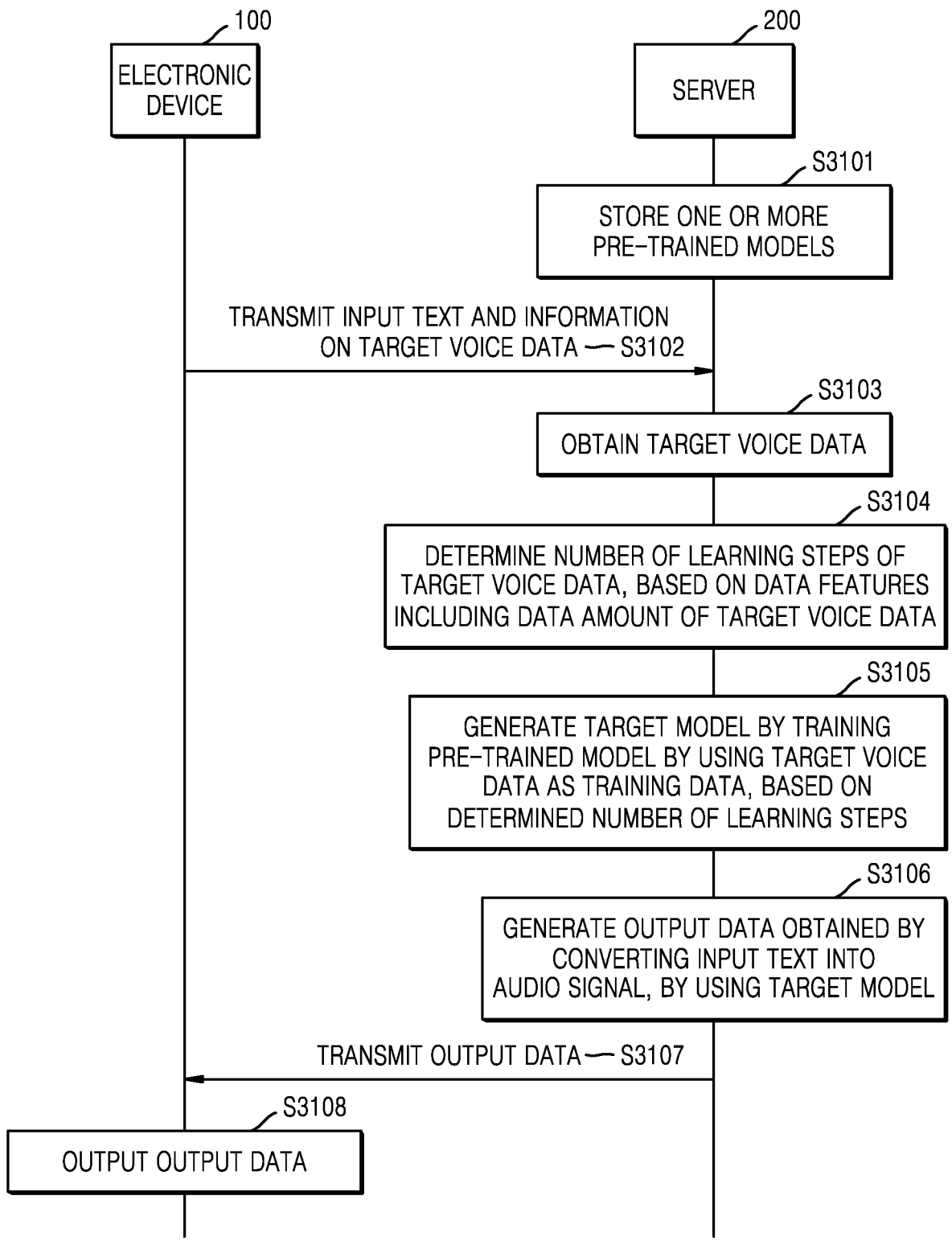
FIG. 31 is a flowchart for describing an example of operations of an electronic device and a server according to an embodiment of the disclosure.

FIG. 31 is a flowchart for describing an example of operations of the electronic device 100 and the server 200, according to an embodiment of the disclosure.

FIG. 31 shows an example in which the server 200 stores pre-trained models, and obtains target voice data, generates a target model, and provides output data to the electronic device 100 at the request of the electronic device 100.

In operation S3101 of FIG. 31, the server 200 may store one or more pre-trained models.

In operation S3102 of FIG. 31, the electronic device 100 may transmit input text and information on target voice data to the server 200. Operation S3102 may correspond to operation S3002 of FIG. 30.

According to an embodiment of the disclosure, the electronic device 100 may request the server 200 to provide a TTS service for the input text with a voice similar to a target voice, based on the information on target voice data, by transmitting the input text and the information on target voice data to the server 200. In operation S3103 of FIG. 31, the server 200 may obtain target voice data. Operation S3103 may correspond to operation S3003 of FIG. 30. In operation S3104 of FIG. 31, the server 200 may determine the number of learning steps of the target voice data, based on data features including a data amount of the target voice data.

In operation S3105 of FIG. 31, the server 200 may generate a target model by training a pre-trained model by using the target voice data as training data, based on the determined number of learning steps.

In operation S3106 of FIG. 31, the server 200 may generate output data obtained by converting the input text into an audio signal, by using the generated target model.

In operation S3107 of FIG. 31, the server 200 may transmit the generated output data to the electronic device 100.

In operation S3108 of FIG. 31, the electronic device 100 may output the output data.

According to an embodiment of the disclosure, the electronic device 100 may provide a TTS service through the server 200. The electronic device 100 may receive, from the server 200, the output data including the audio signal having a voice similar to a target voice, and output the output data through the sound outputter 1230 (see FIG. 34).

Figure 32:
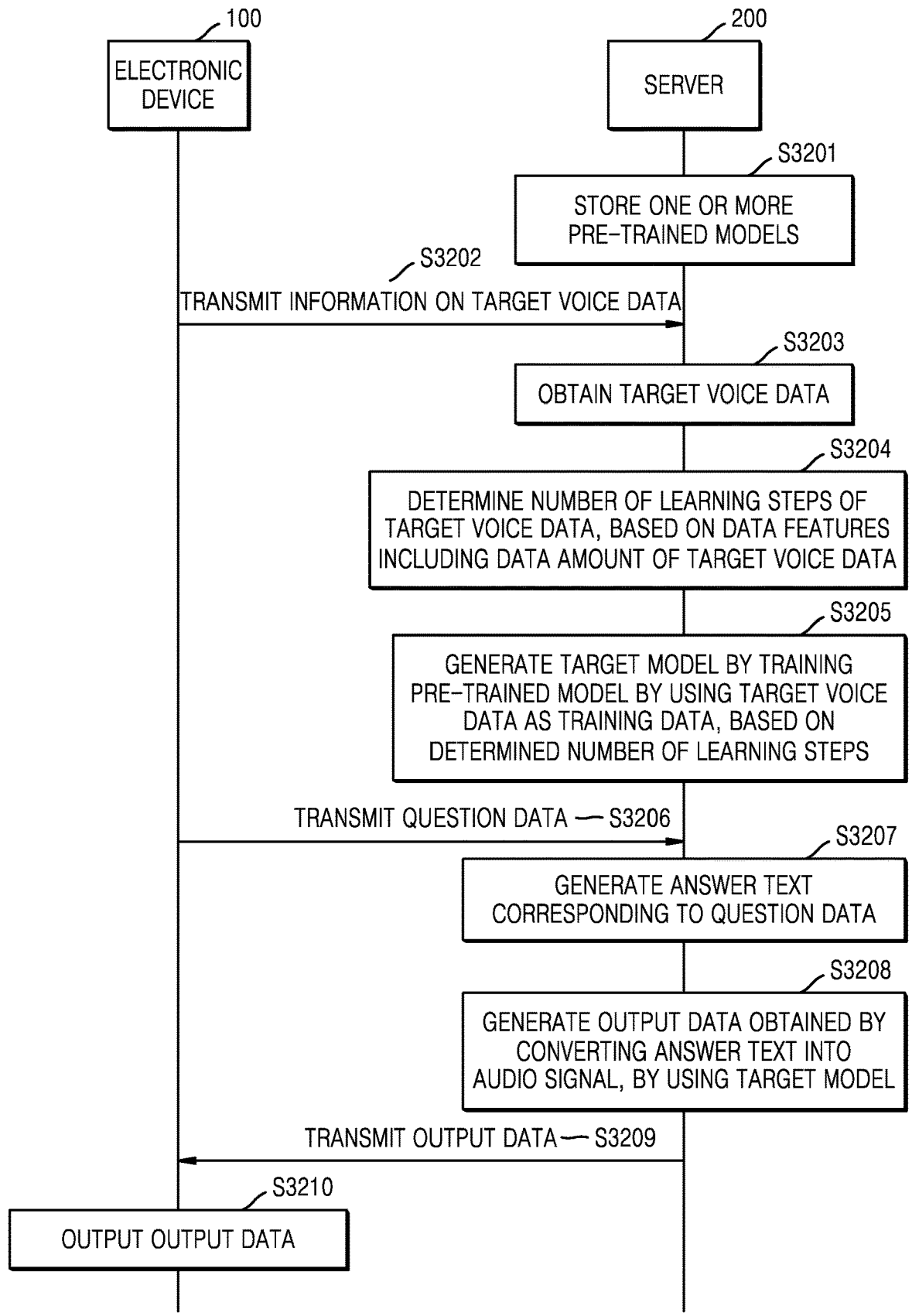
FIG. 32 is a flowchart for describing an example of operations of an electronic device and a server according to an embodiment of the disclosure.

FIG. 32 is a flowchart for describing an example of operations of the electronic device 100 and the server 200, according to an embodiment of the disclosure.

FIG. 32 shows an example in which the server 200 provides an answer to a question of the electronic device 100 by using an audio signal having a voice similar to a target voice requested by the electronic device 100.

In operation S3201 of FIG. 32, the server 200 may store one or more pre-trained models.

In operation S3202 of FIG. 32, the electronic device 100 may transmit information on target voice data to the server 200. Operation S3202 may correspond to operation S3002 of FIG. 30. In operation S3203 of FIG. 32, the server 200 may obtain target voice data. Operation S3203 may correspond to operation S3003 of FIG. 30.

In operation S3204 of FIG. 32, the server 200 may determine the number of learning steps of the target voice data, based on data features including a data amount of the target voice data.

In operation S3205 of FIG. 32, the server 200 may generate a target model by training a pre-trained model by using the target voice data as training data, based on the determined number of learning steps. Operation S3205 may correspond to operation S3005 of FIG. 30. In operation S3206 of FIG. 32, the electronic device 100 may transmit question data to the server 200.

According to an embodiment of the disclosure, the electronic device 100 may generate question data, based on a voice command of a user or text input by the user, and request an answer to the question data from the server 200.

In operation S3207 of FIG. 32, the server 200 may generate answer text corresponding to the question data.

According to an embodiment of the disclosure, the server 200 may obtain the answer text by using a search engine or through an external device (not shown).

In operation S3208 of FIG. 32, the server 200 may generate output data obtained by converting the answer text into an audio signal, by using the target model.

In operation S3209 of FIG. 32, the server 200 may transmit the output data to the electronic device 100.

In operation S3210 of FIG. 32, the electronic device 100 may output the output data.

According to an embodiment of the disclosure, the electronic device 100 may output the answer to the question data by using the audio signal having a voice similar to a target voice.

FIGS. 27 to 32 merely show embodiments of the disclosure, and the disclosure is not limited thereto.

Figure 33:
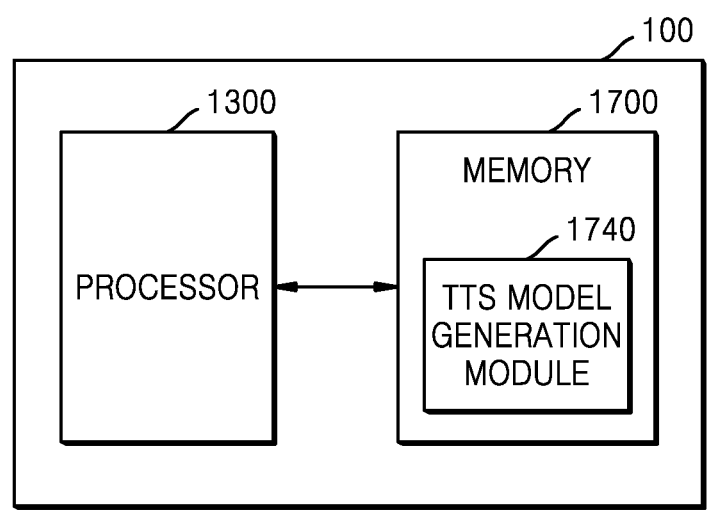
FIG. 33 is a block diagram of an electronic device according to an embodiment of the disclosure.

FIG. 33 is a block diagram of the electronic device 100 according to an embodiment of the disclosure. FIG. 34 is a detailed block diagram of the electronic device 100 according to an embodiment of the disclosure.

Referring to FIG. 33, the electronic device 100 according to an embodiment of the disclosure may include the processor 1300, and the TTS model generation module 1740 in the memory 1700. However, not all elements illustrated in FIG. 33 are essential elements of the electronic device 100. The electronic device 100 may include a larger or smaller number of elements compared to those illustrated in FIG. 33.

For example, referring to FIG. 34, in addition to the memory 1700 and the processor 1300, the electronic device 100 according to an embodiment of the disclosure may further include a user inputter 1100, an outputter 1200, the communicator 1500, and an audio/video (A/V) inputter 1600.

The user inputter 1100 refers to a means used by a user to input data for controlling the electronic device 100. For example, the user inputter 1100 may include a keypad, a dome switch, a touchpad (e.g., a capacitive overlay, resistive overlay, infrared beam, surface acoustic wave, integral strain gauge, or piezoelectric touchpad), a jog wheel, or a jog switch, but is not limited thereto. The user inputter 1100 may be connected to the microphone 1620 to receive a voice input for controlling the electronic device 100.

The outputter 1200 may output an audio signal, a video signal, or a vibration signal, and include a display 1210 and the sound outputter 1230.

The display 1210 outputs information processed in the electronic device 100.

According to an embodiment of the disclosure, the display 1210 may display a user interface and/or a launch screen of an application for generating a TTS model.

Meanwhile, when the display 1210 and a touchpad are layered to configure a touchscreen, the display 1210 may be used not only as an output device but also as an input device. The display 1210 may include at least one of a liquid crystal display, a thin film transistor-liquid crystal display, an organic light-emitting diode, a flexible display, a three-dimensional (3D) display, or an electrophoretic display.

The display 1210 may include a light-emitting device (not shown). The light-emitting device may include, for example, a light-emitting diode and a display panel, but is not limited thereto.

The sound outputter 1230 outputs sound data received from the communicator 1500 or stored in the memory 1700.

According to an embodiment of the disclosure, the sound outputter 1230 may output an audio signal for providing a TTS service.

According to an embodiment of the disclosure, the sound outputter 1230 may output an audio signal generated by a target model.

The processor 1300 generally controls overall operations of the electronic device 100. For example, the processor 1300 may execute programs stored in the memory 1700 to control the user inputter 1100, the outputter 1200, the communicator 1500, and the A/V inputter 1600.

The processor 1300 may control operations of the electronic device 100 to perform the functions of the electronic device 100 described above in relation to FIGS. 1 to 32.

The processor 1300 may include one or more processors. In this case, each of the one or more processors may be a general-purpose processor (e.g., a central processing unit (CPU), an application processor (AP), or a digital signal processor (DSP)), a dedicated graphics processor (e.g., a graphics processing unit (GPU) or a vision processing unit (VPU)), or a dedicated AI processor (e.g., a neural processing unit (NPU)). The one or more processors control processing of input data according to a predefined operation rule or an AI model stored in a memory. Alternatively, when the one or more processors are dedicated AI processors, the dedicated AI processors may be designed in a hardware structure specialized in processing of a specific AI model.

According to an embodiment of the disclosure, the processor 1300 may obtain target voice data based on an utterance input of a specific speaker. The processor 1300 may determine the number of learning steps of the target voice data, based on data features including a data amount of the target voice data.

According to an embodiment of the disclosure, the processor 1300 may determine a pre-trained model.

According to an embodiment of the disclosure, the processor 1300 may generate a target by training the pre-trained model pre-trained to convert text into an audio signal, by using the target voice data as training data, based on the determined number of learning steps.

According to an embodiment of the disclosure, the processor 1300 may generate output data obtained by converting input text into an audio signal, by using the generated target model, and output the generated output data.

According to an embodiment of the disclosure, the processor 1300 may determine the number of learning steps of the target voice data, based on similarity between the data features of the target voice data and data features of voice data used for pre-training of the pre-trained model.

According to an embodiment of the disclosure, as a method of determining the pre-trained model, the processor 1300 may select or newly generate the pre-trained model.

The processor 1300 may select the pre-trained model to learn the target voice data, from among one or more pre-trained models stored in a memory, based on the data features of the target voice data.

The processor 1300 may select the pre-trained model to learn the target voice data, from among one or more pre-trained models stored in a memory, based on the determined number of learning steps.

According to an embodiment of the disclosure, the processor 1300 may generate the pre-trained model to learn the target voice data, based on a plurality of pre-trained models stored in a memory.

The processor 1300 may select a first trained model and a second trained model from among the plurality of pre-trained models stored in the memory, based on the data features of the target voice data, determine a combination ratio between first voice data used for training of the first trained model and second voice data used for training of the second trained model, based on the data features of the target voice data, and combine the first voice data and the second voice data, based on the combination ratio. The processor 1300 may generate the pre-trained model by using the combined voice data as training data.

The processor 1300 may determine the number of learning steps of the combined voice data, based on the data features of the target voice data, and generate the pre-trained model by using the combined voice data as training data, based on the number of learning steps of the combined voice data.

According to an embodiment of the disclosure, the processor 1300 may determine the pre-trained model, determine at least one of an initial learning rate or a learning rate decay method of the target voice data, based on the number of pre-learned steps of the determined pre-trained model, and train the determined pre-trained model by using the target voice data as training data.

According to an embodiment of the disclosure, the processor 1300 may determine the pre-trained model, set at least one of an initial learning rate or a learning rate decay method of the target voice data, based on a preset criterion, and train the determined pre-trained model by using the target voice data as training data. The communicator 1500 may include one or more elements for enabling the electronic device 100 to communicate with an external device. For example, the communicator 1500 may include a short-range wireless communicator 1510, a mobile communicator 1520, and the broadcast receiver 1530.

The short-range wireless communicator 1510 may include a Bluetooth communicator, a Bluetooth low energy (BLE) communicator, a near-field communication (NFC) communicator, a wireless local area network (WLAN) (or wireless fidelity (Wi-Fi)) communicator, a Zigbee communicator, an infrared data association (IrDA) communicator, a Wi-Fi direct (WFD) communicator, a ultra-wideband (UWB) communicator, or an Ant+ communicator, but is not limited thereto.

The mobile communicator 1520 transmits and receives wireless signals to and from at least one of a base station, an external device, or a server in a mobile communication network. Herein, the wireless signals may include various types of data based on transmission and reception of voice call signals, video call signals, or text/multimedia messages.

The broadcast receiver 1530 receives broadcast signals and/or broadcast information through broadcast channels from outside. The broadcast channels may include satellite channels and terrestrial channels. Depending on implementation, the electronic device 100 may not include the broadcast receiver 1530.

The A/V inputter 1600 is used to input audio signals or video signals, and may include, for example, a camera 1610 and a microphone 1620.

The camera 1610 may obtain image frames such as still images or videos by using an image sensor in a video call mode or a camera mode. The images captured by the image sensor may be processed through the processor 1300 or a separate image processor (not shown).

The image frames processed in the camera 1610 may be stored in the memory 1700 or be transmitted through the communicator 1500 to an external device. Depending on configuration, the camera 1610 may include two or more cameras.

The microphone 1620 receives an external sound signal and processes the same into electrical voice data. For example, the microphone 1620 may receive the sound signal from an external device or a speaker. The microphone 1620 may use various noise cancellation algorithms to cancel noise created while receiving the external sound signal.

According to an embodiment of the disclosure, the microphone 1620 may receive a sound signal based on utterance of a specific speaker.

The memory 1700 may store programs for processing and control operations of the processor 1300, and store data input to or to be output from the electronic device 100.

The memory 1700 may include at least one type of storage medium from among flash memory, a hard disk, a multimedia card micro, a memory card (e.g., a secure digital (SD) or extreme digital (XD) memory card), random access memory (RAM), static RAM (SRAM), read-only memory (ROM), electrically erasable programmable ROM (EEPROM), programmable ROM (PROM), magnetic memory, a magnetic disc, and an optical disc.

The programs stored in the memory 1700 may be classified into a plurality of modules, e.g., a user interface (UI) module 1710, a touchscreen module 1720, a notification module 1730, and the TTS model generation module 1740.

The UI module 1710 may provide a specialized UI or graphical user interface (GUI) connected to the electronic device 100, per application.

The touchscreen module 1720 may detect a touch gesture of a user on a touchscreen, and transmit information on the touch gesture to the processor 1300. The touchscreen module 1720 according to an embodiment of the disclosure may recognize and analyze touch code. The touchscreen module 1720 may be configured as separate hardware including a controller.

The notification module 1730 may generate a notification signal to notify that an event of the electronic device 100 has occurred. Examples of the event occurring in the electronic device 100 may include schedules, completion of execution of voice commands, and key signal inputs. The notification module 1730 may output the notification signal in the form of a video signal through the display 1210, or in the form of an audio signal through the sound outputter 1230.

The TTS model generation module 1740 is described in detail above in relation to FIG. 4 and will not be repeatedly described herein.

FIG. 35 is a block diagram of the server 200 according to an embodiment of the disclosure.

The server 200 according to an embodiment of the disclosure may include at least some of the elements described above in relation to FIGS. 33 and 34.

Referring to FIG. 35, the server 200 according to an embodiment of the disclosure may include the memory 2700, a communicator 2500 (e.g., a transceiver), and a processor 2300 (e.g., at least one processor). However, not all elements illustrated in FIG. 35 are essential elements of the server 200. The server 200 may include a larger or smaller number of elements compared to those illustrated in FIG. 35.

The processor 2300 generally controls overall operations of the server 200. For example, the processor 2300 may execute programs stored in the memory 2700 to control overall operations.

According to an embodiment of the disclosure, at least some of the operations of the electronic device 100, which are described above in relation to FIGS. 1 to 34, may be performed by the processor 2300 of the server 200.

The processor 2300 may include one or more processors. In this case, each of the one or more processors may be a general-purpose processor (e.g., a CPU, an AP, or a DSP), a dedicated graphics processor (e.g., a GPU or a VPU), or a dedicated AI processor (e.g., a NPU). The one or more processors control processing of input data according to a predefined operation rule or an AI model stored in a memory. Alternatively, when the one or more processors are dedicated AI processors, the dedicated AI processors may be designed in a hardware structure specialized in processing of a specific AI model.

According to an embodiment of the disclosure, the memory 2700 of the server 200 may store programs for processing and control operations of the processor 2300, and store data input to or to be output from the server 200.

The memory 2700 may include at least one type of storage medium from among flash memory, a hard disk, a multimedia card micro, a memory card (e.g., a SD or XD memory card), RAM, SRAM, ROM, EEPROM, PROM, magnetic memory, a magnetic disc, and an optical disc.

According to an embodiment of the disclosure, the communicator 2500 may include one or more elements for enabling the server 200 to communicate with an external device. For example, the communicator 2500 may include a short-range wireless communicator (not shown), a mobile communicator (not shown), and a broadcast receiver (not shown).

The short-range wireless communicator may include a Bluetooth communicator, a BLE communicator, a NFC communicator, a WLAN (or Wi-Fi) communicator, a Zigbee communicator, an IrDA communicator, a WFD communicator, a UWB communicator, or an Ant+ communicator, but is not limited thereto.

The mobile communicator transmits and receives wireless signals to and from at least one of a base station, an external device, or a server in a mobile communication network. Herein, the wireless signals may include various types of data based on transmission and reception of voice call signals, video call signals, or text/multimedia messages.

The broadcast receiver receives broadcast signals and/or broadcast information through broadcast channels from outside. The broadcast channels may include satellite channels and terrestrial channels. Depending on implementation, the server 200 may not include the broadcast receiver.

Meanwhile, the afore-described embodiments of the disclosure may be written as programs executable on a computer, and be implemented by a general-purpose digital computer for operating the programs by using a computer-readable medium. Data structures used in the afore-described embodiments of the disclosure may be recorded on the computer-readable medium via a variety of means. The afore-described embodiments of the disclosure may be implemented in the form of a recording medium including instructions executable by the computer, e.g., a program module executed by the computer. For example, methods implemented by software modules or algorithms may be stored in a computer-readable medium as computer-readable codes or program commands executable by the computer.

The computer-readable medium may be an arbitrary recording medium accessible by the computer, and examples thereof may include volatile, non-volatile, detachable, and non-detachable media. Examples of the computer-readable medium include magnetic storage media (e.g., read-only memory (ROM), floppy disks, and hard disks) and optical recording media (e.g., compact disc-ROM (CD-ROM) and digital versatile discs (DVDs)), but are not limited thereto The computer-readable medium may include a computer storage medium and a communication medium.

A plurality of computer-readable recording media may be distributed over network-coupled computer systems, and data, e.g., program instructions and codes, stored in the distributed recording media may be executed by at least one computer.

Particular implementations described herein merely correspond to embodiments of the disclosure and do not limit the scope of the disclosure in any way. For brevity, descriptions of known electronic configurations, control systems, software, and other functional aspects of the systems may not be provided herein.

While the disclosure has been particularly shown and described with reference to embodiments of the disclosure thereof, it will be understood by one of ordinary skill in the art that various changes in form and details may be made therein without departing from the scope of the disclosure. Therefore, it should be understood that the afore-described embodiments of the disclosure are illustrative in all aspects and do not limit the disclosure. For example, each element described as a single element may be implemented in a distributed manner and, likewise, elements described as distributed elements may be implemented in a combined manner.

All examples and terms used herein are merely for a detailed description of the disclosure and the scope of the disclosure is not limited by those examples and terms unless defined in the claims.

Moreover, no element is essential for implementation of the disclosure unless the element is particularly described as being "essential" or "critical".

It will be understood by one of ordinary skill in the art that the embodiments of the disclosure may be modified without departing from the scope of the disclosure.

It should be understood that various changes in form and details may be made in the embodiments of the disclosure and that the embodiments of the disclosure cover all modifications, equivalents, and alternatives falling within the scope of the disclosure. Therefore, the afore-described embodiments of the disclosure should be considered in a descriptive sense only and not for purposes of limitation.

The scope of the disclosure is defined not by the detailed description of the disclosure but by the appended claims, and all variations derived from the scope defined by the claims and their equivalents will be construed as being included in the scope of the disclosure.

As used herein, the term " . . . unit" or "module" denotes an entity for performing at least one function or operation, and may be implemented using hardware, software, or a combination of hardware and software.

The "unit" or "module" may also be implemented as a program stored in an addressable storage medium and executable by a processor.

For example, the term "unit" or "module" may be implemented as elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

As used herein, the expression "A may include one of a1, a2, and a3" broadly means that an example of an element that may be included in element A is a1, a2, or a3.

The expression does not limit the element that may be included in element A, to a1, a2, or a3. Therefore, it should be noted that the expression is not restrictively construed to exclude elements other than a1, a2, and a3, from examples of the element that may be included in A.

The expression means that A may include a1, include a2, or include a3. The expression does not mean that elements included in A are always selectively determined within a certain set. For example, it should be noted that the expression is not restrictively construed to limit the element included in element A, to a1, a2, or a3 selected from a set including a1, a2, and a3.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An operating method of an electronic device, the operating method comprising:
   based on an utterance input of a specific speaker, obtaining target voice data;
   based on a data amount of the target voice data among data features of the target voice data, determining a number of learning steps of the target voice data;
   based on the number of learning steps, generating a target model by training a pre-trained model using the target voice data as training data, the pre-trained model being pre-trained to convert text into one or more audio signals;
   generating output data by converting input text into an audio signal using the target model; and
   outputting the output data.

2. The operating method of claim 1, wherein the generating of the target model comprises, based on the data features of the target voice data, selecting the pre-trained model from among one or more pre-trained models stored in a memory to learn the target voice data.

3. The operating method of claim 1, wherein the generating of the target model comprises based on the number of learning steps, selecting the pre-trained model from among one or more pre-trained models stored in a memory to learn the target voice data.

4. The operating method of claim 1, wherein the generating of the target model comprises, based on a plurality of pre-trained models stored in a memory, generating the pre-trained model to learn the target voice data.

5. The operating method of claim 4, wherein the generating of the pre-trained model comprises:
   based on the data features of the target voice data, selecting a first trained model and a second trained model from among the plurality of pre-trained models stored in the memory, and determining a combination ratio between first voice data used for training of the first trained model and second voice data used for training of the second trained model;
   based on the combination ratio, combining the first voice data and the second voice data; and
   generating the pre-trained model by using the combined first voice data and second voice data as the training data.

6. The operating method of claim 5, wherein the generating of the pre-trained model further comprises:
   based on the data features of the target voice data, determining a number of learning steps of the combined first voice data and second voice data; and
   based on the number of learning steps of the combined first voice data and second voice data, generating the pre-trained model by using the combined first voice data and second voice data as the training data.

7. The operating method of claim 1, wherein the data features of the target voice data further comprise at least one of acoustic features of the target voice data, speaker features of the target voice data, or content features of the target voice data.

8. The operating method of claim 1, wherein the determining of the number of learning steps of the target voice data comprises determining the number of learning steps of the target voice data based on a similarity between at least one of the data features of the target voice data and at least one data feature among data features of voice data used for pre-training of the pre-trained model.

9. The operating method of claim 1, wherein the generating of the target model comprises:
   determining the pre-trained model;

based on a number of pre-learned steps of the pre-trained model, determining at least one of an initial learning rate or a learning rate decay method of the target voice data; and training the pre-trained model by using the target voice data as the training data.

10. The operating method of claim 1, wherein the generating of the target model comprises:

determining the pre-trained model;

after determining the pre-trained model, setting at least one of an initial learning rate or a learning rate decay method of the target voice data based on a preset criterion; and training the pre-trained model by using the target voice data as the training data.

11. The operating method of claim 1, wherein a performance of the target model is determined using at least one of a pronunciation error rate, prosody, or sound quality of the output data.

12. The operating method of claim 1, wherein the obtaining of the target voice data comprises at least one of:

obtaining voice data based on the utterance input of the specific speaker input through a microphone;

obtaining voice data based on the utterance input of the specific speaker extracted from broadcast content;

obtaining voice data based on the utterance input of the specific speaker extracted from voice data stored during a call connection;

obtaining voice data pre-stored in a memory; or obtaining the target voice data through a communicator from an external server.

13. The operating method of claim 1, further comprising:

obtaining, as the input text, at least one of text obtained based on a user input, text extracted from pre-stored content, or text generated as a result of executing an application.

14. An electronic device comprising:

a memory storing one or more instructions; and at least one processor coupled to the memory and configured to execute the one or more instructions stored in the memory to:

based on an utterance input of a specific speaker, obtain target voice data, based on a data amount of the target voice data among data features of the target voice data, determine a number of learning steps of the target voice data, based on the number of learning steps, generate a target model by training a pre-trained model using the target voice data as training data, the pre-trained model being pre-trained to convert text into one or more audio signals, generate output data by converting input text into an audio signal using the target model, and output the output data.

15. The electronic device of claim 14, wherein the at least one processor is further configured to execute the one or more instructions to:

based on the data features of the target voice data, select the pre-trained model from among one or more pre-trained models stored in the memory to learn the target voice data.

16. The electronic device of claim 14, wherein the at least one processor is further configured to execute the one or more instructions to:

based on the number of learning steps, select the pre-trained model from among one or more pre-trained models stored in the memory to learn the target voice data.

17. The electronic device of claim 14, wherein the at least one processor is further configured to execute the one or more instructions to:

based on a plurality of pre-trained models stored in the memory, generate the pre-trained model to learn the target voice data.

18. The electronic device of claim 17, wherein the at least one processor is further configured to execute the one or more instructions to:

based on the data features of the target voice data, select a first trained model and a second trained model from among the plurality of pre-trained models stored in the memory and determine a combination ratio between first voice data used for training of the first trained model and second voice data used for training of the second trained model;

based on the combination ratio, combine the first voice data and the second voice data; and generate the pre-trained model by using the combined first voice data and second voice data as the training data.

19. The electronic device of claim 18, wherein the at least one processor is further configured to execute the one or more instructions to:

based on the data features of the target voice data, determine a number of learning steps of the combined first voice data and second voice data; and based on the number of learning steps of the combined first voice data and second voice data, generate the pre-trained model by using the combined first voice data and second voice data as the training data.

20. A non-transitory computer-readable recording medium having recorded thereon at least one program comprising commands which, when executed by a computer, perform an operating method comprising:

based on an utterance input of a specific speaker, obtaining target voice data;

based on a data amount of the target voice data among data features of the target voice data, determining a number of learning steps of the target voice data;

based on the number of learning steps, generating a target model by training a pre-trained model using the target voice data as training data, the pre-trained model being pre-trained to convert text into one or more audio signals;

generating output data by converting input text into an audio signal using the target model; and outputting the output data.

* * * * *